United States Patent [19]
De Vries, Jr. et al.

[11] Patent Number: 5,938,810
[45] Date of Patent: *Aug. 17, 1999

[54] APPARATUS FOR TEMPERING AND BENDING GLASS

[75] Inventors: Marrin De Vries, Jr.; Donald L. Bareman; Mervin Dirkse, all of Holland; Niels Alfred Olesen, Zeeland; James M. Beebe, Grand Haven, all of Mich.

[73] Assignee: Donnelly Corporation, Holland, Mich.

[ * ] Notice: This patent is subject to a terminal disclaimer.

[21] Appl. No.: 08/866,764

[22] Filed: May 30, 1997

Related U.S. Application Data

[63] Continuation-in-part of application No. 08/735,885, Oct. 23, 1996, Pat. No. 5,857,358.

[51] Int. Cl.⁶ .............................. C03B 23/03; C03B 27/00
[52] U.S. Cl. ................................. 65/268; 65/287; 65/288; 65/291; 65/306; 65/319; 65/348; 65/355; 65/374.11; 65/374.12; 65/103; 65/106; 65/115
[58] Field of Search .................................... 65/25.2, 25.4, 65/64, 103, 104, 106, 107, 114, 115, 111, 160, 268, 273, 275, 287, 288, 306, 319, 291, 348, 355, 356, 374.1, 374.13, 374.11, 374.12

[56] References Cited

U.S. PATENT DOCUMENTS

| | | |
|---|---|---|
| 1,879,699 | 9/1932 | Long . |
| 1,895,548 | 1/1933 | Lebel . |
| 1,981,560 | 11/1934 | Littleton ..................................... 43/45 |
| 2,068,799 | 1/1937 | Guyer ........................................ 49/79 |
| 2,131,404 | 9/1938 | Long ......................................... 49/45 |
| 2,251,159 | 7/1941 | Owen ........................................... 49/1 |
| 2,353,996 | 7/1944 | Cooke et al. ............................... 18/56 |
| 2,570,309 | 10/1951 | Black ........................................... 49/7 |
| 2,575,734 | 11/1951 | Schulman ................................... 18/17 |
| 2,799,793 | 7/1957 | De Cain ................................. 313/312 |
| 2,817,928 | 12/1957 | Lambert et al. ............................. 49/84 |

(List continued on next page.)

FOREIGN PATENT DOCUMENTS

| | | |
|---|---|---|
| 0373265 | 6/1990 | European Pat. Off. . |
| 0404676 | 12/1990 | European Pat. Off. . |
| 0404677 | 12/1990 | European Pat. Off. . |
| 0667320 | 8/1995 | European Pat. Off. . |
| 983072 | 6/1951 | France . |
| 1540411 | 9/1968 | France . |
| 1553891 | 1/1969 | France . |
| 1559723 | 3/1969 | France . |
| 1010245 | 6/1957 | Germany . |
| 39-1029 | 5/1964 | Japan . |
| 51-513 | 1/1976 | Japan . |
| 984881 | 3/1965 | United Kingdom . |

OTHER PUBLICATIONS

Leo Alting, *Manufacturing Engineering Processes*, "Solid Materials: Mass–Conserving Processes", pp. 148, 149, and 162.
Patents Act 1977: Search Report Under Section 17 (5).

*Primary Examiner*—Steven P. Griffin
*Attorney, Agent, or Firm*—Van Dyke, Gardner, Linn & Burkhart, LLP

[57] ABSTRACT

A method of and apparatus for bending and tempering a sheet of glass heated to a formable state provides an improved rigid mold and pressing member for pressing the heated sheet against the rigid mold which cools and bends the sheet. The pressing member includes a conformable pressing element which permits a manifold to be positioned between the rigid mold and the pressing member to direct a gas to cool the heated sheet of glass during bending. The conformable pressing element is pressurized into a convex shape for initially pressing on a portion of the heated sheet and for rolling the heated sheet onto the rigid mold. The rigid mold and the conformable pressing element may each include a cover to increase the heat transfer from the heated sheet to the bending and tempering apparatus. Furthermore, the covers may have increased thermal conductivity in their peripheral regions for increased cooling of the edge of the sheet of glass.

66 Claims, 14 Drawing Sheets

U.S. PATENT DOCUMENTS

| | | | |
|---|---|---|---|
| 2,895,260 | 7/1959 | Jellyman et al. | 49/89 |
| 3,128,322 | 4/1964 | Young | 264/314 |
| 3,129,089 | 4/1964 | Torok | 65/356 |
| 3,169,900 | 2/1965 | Ermlich | 161/149 |
| 3,203,777 | 8/1965 | Berry et al. | 65/24 |
| 3,265,484 | 8/1966 | Ritter, Jr. | 65/104 |
| 3,333,934 | 8/1967 | Seymour | 65/32 |
| 3,365,286 | 1/1968 | Nedelec | 65/114 |
| 3,374,077 | 3/1968 | Cypher | 65/104 |
| 3,387,962 | 6/1968 | Whitmire | 65/104 |
| 3,459,521 | 8/1969 | Nedelec | 65/25 |
| 3,469,963 | 9/1969 | Beattie | 65/115 |
| 3,473,909 | 10/1969 | Bennett et al. | 65/106 |
| 3,484,225 | 12/1969 | Bognar . | |
| 3,507,639 | 4/1970 | Seymour | 65/104 |
| 3,600,150 | 8/1971 | Rougeux | 65/268 |
| 3,607,188 | 9/1971 | Stilley | 65/106 |
| 3,634,059 | 1/1972 | Miller | 65/273 |
| 3,677,731 | 7/1972 | Martin | 65/106 |
| 3,694,182 | 9/1972 | Akfirat et al. | 65/288 |
| 3,806,330 | 4/1974 | Martin . | |
| 3,816,089 | 6/1974 | Seymour | 65/273 |
| 3,837,833 | 9/1974 | Couture et al. | 65/288 |
| 3,951,634 | 4/1976 | Hall et al. | 65/104 |
| 4,043,782 | 8/1977 | Bamford et al. | 65/104 |
| 4,043,784 | 8/1977 | Reese et al. | 65/107 |
| 4,184,865 | 1/1980 | Liebal | 65/319 |
| 4,204,853 | 5/1980 | Seymour | 65/106 |
| 4,233,050 | 11/1980 | Comperatore et al. . | |
| 4,312,823 | 1/1982 | Kraakman et al. | 264/107 |
| 4,349,374 | 9/1982 | Rupp | 65/107 |
| 4,361,433 | 11/1982 | Smith, Jr. et al. | 65/116 |
| 4,364,766 | 12/1982 | Nitschke | 65/160 |
| 4,522,641 | 6/1985 | Hagedorn et al. | 65/291 |
| 4,555,258 | 11/1985 | Curiel | 65/319 |
| 4,678,495 | 7/1987 | Yoshizawa | 65/287 |
| 4,723,976 | 2/1988 | Shanaberger | 65/29 |
| 4,723,983 | 2/1988 | Erdmann et al. | 65/268 |
| 4,767,439 | 8/1988 | Reunamaki | 65/351 |
| 4,773,926 | 9/1988 | Letemps et al. | 65/114 |
| 4,825,376 | 4/1989 | Brinker et al. | 364/473 |
| 4,826,522 | 5/1989 | d'Iribarne et al. | 65/115 |
| 4,865,639 | 9/1989 | Kudo . | |
| 4,902,331 | 2/1990 | Vanaschen et al. | 65/106 |
| 4,906,271 | 3/1990 | D'Iribarne et al. | 65/273 |
| 4,918,946 | 4/1990 | Vanaschen et al. | 65/104 |
| 4,950,320 | 8/1990 | Vanaschen et al. | 65/273 |
| 4,983,205 | 1/1991 | Kuster et al. | 65/290 |
| 5,007,949 | 4/1991 | Mathivat et al. | 65/160 |
| 5,021,075 | 6/1991 | Vanaschen et al. | 65/287 |
| 5,022,907 | 6/1991 | Vanaschen et al. . | |
| 5,053,069 | 10/1991 | Vanaschen et al. | 65/106 |
| 5,079,931 | 1/1992 | Lehto et al. | 65/288 |
| 5,122,176 | 6/1992 | Goettler . | |
| 5,139,552 | 8/1992 | Yoshizawa et al. | 65/273 |
| 5,178,660 | 1/1993 | Wampler et al. | 65/273 |
| 5,183,491 | 2/1993 | D'Iribarne et al. | 65/351 |
| 5,203,905 | 4/1993 | Kuster et al. | 65/107 |
| 5,261,808 | 11/1993 | Onoe et al. | 425/387 |
| 5,286,271 | 2/1994 | Rueter et al. . | |
| 5,320,661 | 6/1994 | Fecik et al. | 65/104 |
| 5,387,270 | 2/1995 | Bremer et al. | 65/29.12 |
| 5,401,286 | 3/1995 | Goolsbay et al. . | |
| 5,427,599 | 6/1995 | Greschner et al. | 65/305 |
| 5,649,990 | 7/1997 | Frank et al. | 65/106 |
| 5,656,055 | 8/1997 | Frank et al. | 65/287 |
| 5,857,358 | 1/1999 | De Vries, Jr. et al. | 65/106 |

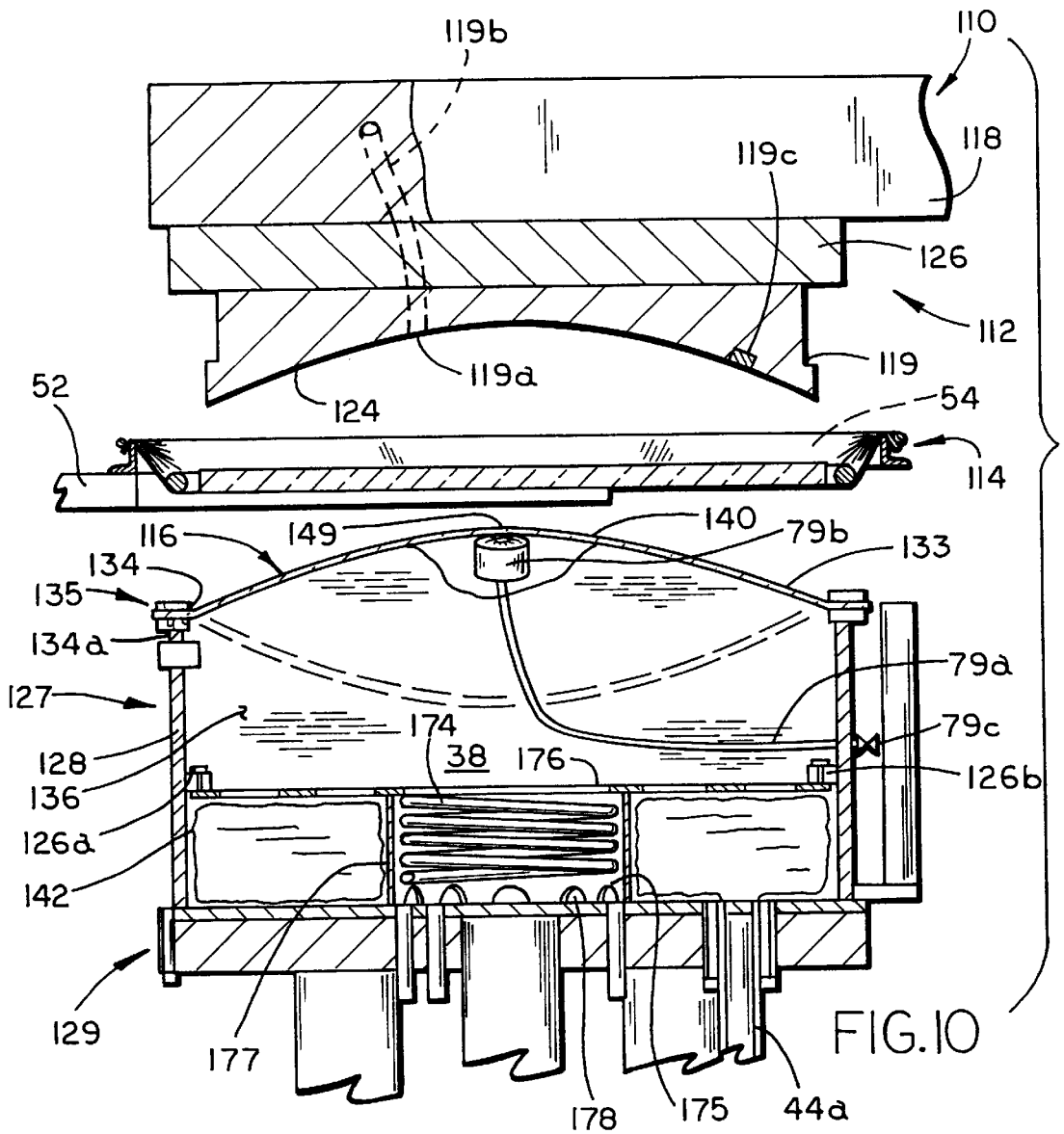
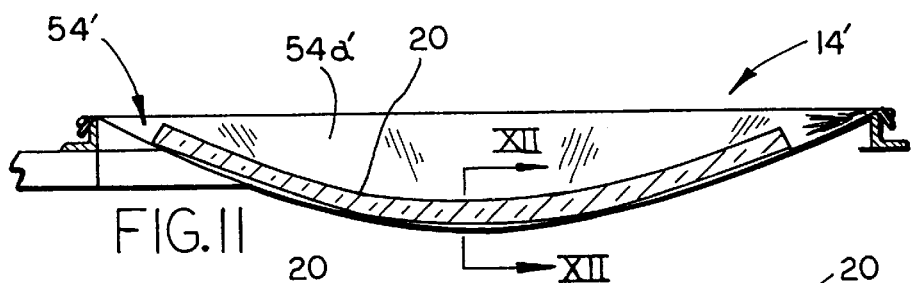
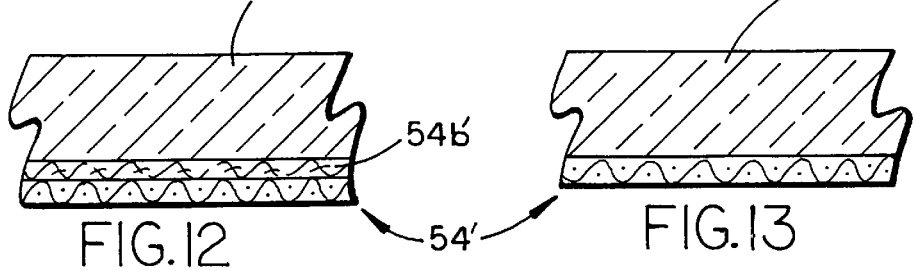

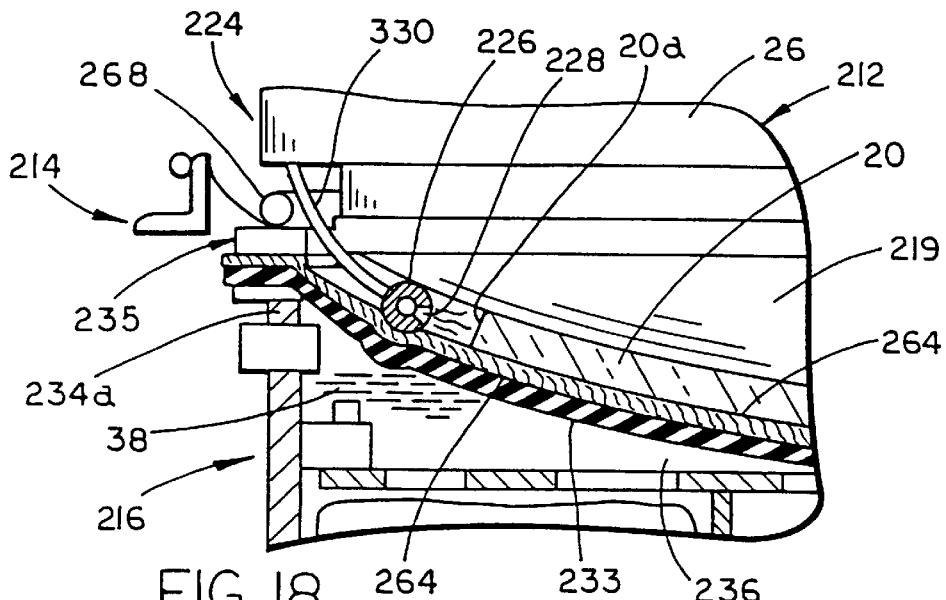
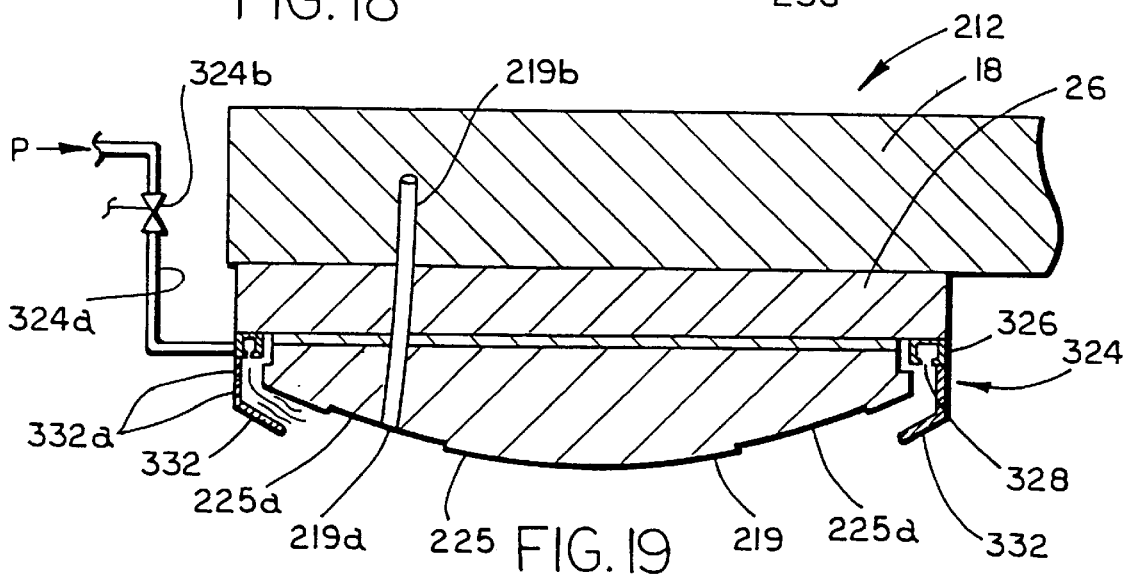
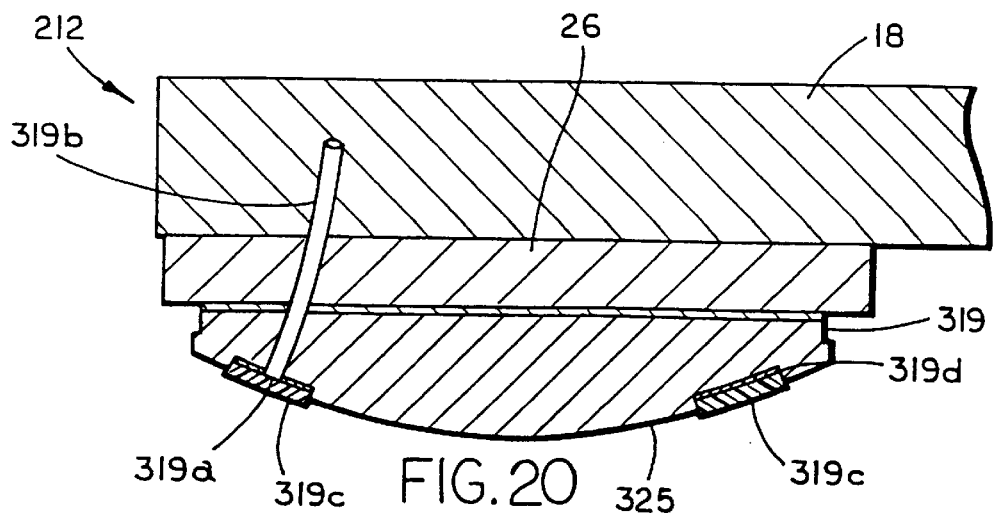

APPARATUS FOR TEMPERING AND BENDING GLASS

CROSS REFERENCE TO RELATED APPLICATION

This is a continuation-in-part of, commonly assigned United States patent application entitled Method and Apparatus for Bending Glass, filed Oct. 23, 1996, Ser. No. 08/735,885, now U.S. Pat. No. 5,857,358, which is incorporated herein by reference in its entirety.

TECHNICAL FIELD AND BACKGROUND OF THE INVENTION

The present invention relates to an improved method and apparatus for tempering and bending glass. More particularly, the present invention relates to a method and apparatus for tempering and molding glass using a flexible bladder.

A conventional glass bending apparatus typically includes two rigid molds—a male mold and female mold—which are brought together to conform a heated sheet of glass positioned therebetween to the shape of the two molds during the press cycle of the bending process. Some bending methods may include a slump bending step, which is initiated before the press cycle begins. In such a step, the heated glass sheet may be held in a holder that includes a generally concave, upper support surface, formed by a formable material such as a stainless steel mesh sheet. Since the sheet of glass is heated to a temperature in the range of 1000 degrees Fahrenheit to 1250 degrees Fahrenheit and is, therefore, in a softened state, the glass sheet partially conforms to the concave shape of the mesh sheet. Thereafter, as the female mold is moved towards the male mold, the female mold presses against the edge portions of the heated sheet of glass and the male mold presses on the center of the heated sheet of glass to start the press cycle of the bending process. As the two molds are pressed together, the bearing contact and pressure exerted by the molds on the edge portions and in the center causes the molds to further bend the sheet of glass. As the sheet bends, the bearing contact and pressure from the female mold expands from the edge portions of the sheet inward until it meets with the bearing pressure from the male mold, somewhere between the center and the perimeter of the sheet. Consequently, as the bearing pressure expands inwardly from the perimeter of the glass sheet, buckles form at the periphery of the plate to relieve forces due to the foreshortening of the compression side of the glass. As the bending is increased the buckles extend toward the center. The magnitude of the buckles are the greatest at the edge of the glass sheet, diminishing toward the center of the sheet.

The larger the buckles and the further the buckles extend into the glass sheet, the smaller the useable area of the glass. This useable area is referred to as the "quality area." The size of the quality area directly impacts the value of the glass. The larger the quality area, the larger the size of the final product-the curved glass-and the greater the profit. In optical quality glass or plastic, the tolerance for distortions in the surface of the glass is extremely low. Hence the size of the quality area for optical glass is relatively small when conventional glass bending techniques are used.

In addition to the limitations on the quality of the glass produced by conventional glass bending techniques, there are numerous process controls. The male and female molds require accurate alignment. This step can take up to two hours. Furthermore, the two rigid molds of the conventional glass bending apparatus require substantially perfect alignment of the heated sheet of glass between the two molds. If the glass sheet is not properly aligned, the peripheral edges of the sheet rest in a non-horizontal plane within the female mold so that when the female mold is moved toward the male mold, the male mold will first make contact with a portion of the glass that is off-set from the center of the glass sheet. Therefore, the glass sheet will have a bend that is off-center and, more than likely, the glass sheet will exhibit exaggerated buckling at least on one side of the sheet. Moreover, the conventional glass bending apparatus requires the temperature of the heated sheet of glass to be controlled within about 5 degrees. Also, debris, such as broken pieces of glass, that may be inadvertently left in the molding apparatus could damage one or both of the molds during the bending process.

Conventional methods of toughening or tempering a sheet of glass include air blast tempering and contact tempering. Air blast tempering is achieved by blowing cold air streams onto a sheet of glass heated to a toughening temperature. During the toughening treatment, the glass sheet is either held in a vertical position by tongs, which grip the upper edge of the glass sheet, or the glass sheet rests in a horizontal orientation with its edges resting on the perimeter of a support or on an air cushion. In contrast, contact tempering is achieved by contacting a hot glass sheet with cooled surfaces of rigid pressing plates of a press. Contact tempering generally achieves lower deformations or distortions of the glass sheet than air toughening where the glass sheet is only held at an edge or on one face.

Bending and tempering of a glass sheet is typically performed in two separate steps. The bending step includes heating a sheet of glass and positioning the heated sheet of glass between two rigid molds to conform the glass sheet to the molds. After bending, the bent glass sheet is immediately transferred to a cooling area. Once in the cooling area, air is blasted onto the bent glass sheet to cool the exterior surfaces of the glass and thereby temper the glass. However, this type of apparatus is typically only suitable for tempering and bending glass sheets of 3 mm thick or greater. Thinner sheets of glass do not have sufficient heat capacity to hold the heat until the bending process is complete since thin sheets undergo rapid heat loss during bending due to the relatively cool bending tools and cooler ambient atmosphere in the bending area. As a result, the temperature of the glass sheet is decreased to a level below the minimum temperature at which adequate tempering can be affected. Rapid heat loss can be compensated for by overheating the thin sheet of glass prior to bending, but overheating tends to degrade the surface quality of the finish glass sheet which results from heat strains, pitting and the like. In some processes, the bending molds are positioned within the furnace to maintain the temperature of the thin sheet at the desired tempering temperature. However, this process restricts the types of mold material and impedes mold servicing.

An apparatus for contact tempering and bending a sheet of glass is disclosed in U.S. Pat. No. 4,826,522 to Benoit D'Iribarne and Paul Houang in which rigid cooling plates bend and cool the glass sheet simultaneously. The edges of the glass sheet are air tempered by compressed air, which is blown onto the edges during the contacting step. However, this apparatus is typically suited for glass sheets of 5 mm thickness or greater, and is not well suited for tempering thin sheets of glass. While contact tempering is generally capable of tempering thinner glass than air blast tempering and, generally, provides a better conformance to the design shape for convex and concave parts, contact tempering has heretofore not been suitable for tempering very thin glass sheets, on the order of 3 mm or less.

Consequently, there is a need for an improved method and apparatus for tempering and bending glass that is suitable for relatively thin sheets of glass, for example sheets of glass having a nominal thickness of 3 mm or less, or for example, sheets having a nominal thickness of 1.7 mm or less, sheets having nominal thickness of 1.1 mm or less as well as other thickness. Moreover, there is a need for an improved method and apparatus for tempering and bending glass that will increase the size of the quality zone of the tempered sheet of glass and reduce the number of process steps and inputs required to control the process, while at the same time providing more control and uniformity to the tempering and bending process.

SUMMARY OF THE PRESENT INVENTION

Accordingly, the present invention provides a new and unique method and apparatus for tempering and bending a glass sheet which includes a flexible bladder that rolls a sheet of glass heated to a formable state against a rigid mold. The bladder is adapted to cool the heated sheet and apply pressure to a portion of the heated sheet, radiating the pressure from that portion to the rest of the surface area of the glass sheet in a rolling action, thereby providing a uniform pressure to the heated sheet while providing sufficient cooling to generally simultaneously temper the heated sheet glass.

According to one aspect, the bending and tempering apparatus includes a rigid mold and a conformable pressing element. The pressing element is adapted to cool the heated sheet and to assume a convex upper surface for pressing a portion of the heated sheet against the rigid mold and for rolling the heated sheet from that portion against the molding surface of the rigid mold for conforming the sheet to the molding surface of the rigid mold by radiating the pressure from that portion to the remaining surface area of the heated sheet.

In other aspects, one of the rigid mold and the conformable pressing element includes a cover, which is adapted to cool the heated sheet. The cover may include a plurality of openings for directing air to the heated sheet of glass while the heated sheet is pressed or rolled against the rigid mold. In another aspect, the peripheral region of the cover has a thermal coefficient of conductivity and heat capacity that is greater than the thermal coefficient of conductivity and heat capacity of the central region of the cover so that the perimeter of the heated sheet cools at a faster rate than the central portion of the heated sheet of glass to thereby temper the sheet of glass. The cover may include a plurality of inserts which define the thermal coefficients of conductivity and heat capacity of the peripheral region and the central region, with each insert preferably having a thermal coefficient of conductivity in the range of about 10 to 500 BTU/(hr.ft.° F.) and a heat capacity in a range of about 0.1 to 100 BTU/ft$^3$-° F. More preferably, each insert has a thermal coefficient of conductivity in the range of about 30 to 300 BTU/(hr.ft.° F.). Most preferably, each insert has a thermal coefficient of conductivity in a range of about 46 to 247 BTU/(hr.ft.° F.) and a heat capacity in the range of about 30 to 70 BTU/ft$^3$-° F.

In yet another aspect, the conformable pressing element is preferably supported by a frame, which includes a chamber below the conformable pressing element and an incompressible fluid in the chamber for expanding and urging the conformable pressing element into a convex shape. The incompressible fluid may be cooled by a heat exchanger so that as the conformable pressing element presses the sheet against the rigid mold, the conformable pressing element cools the heated sheet to thereby generally simultaneously temper the sheet of glass. In this aspect, the heat is rapidly removed from the edge of the glass, preferably through a thin layer of high thermal conducting material, and transferred to the incompressible fluid, preferably a medium having high heat capacity such as water.

According to another aspect of the invention, an apparatus for bending and tempering a sheet of glass heated to a formable state includes a rigid mold, a conformable pressing element, and an air manifold. One of the rigid mold and the conformable pressing element is adapted to reciprocate between a holding position and a pressing position, with the conformable pressing element adapted to press and roll the heated sheet against the rigid mold for conforming the heated sheet to the rigid mold. The air manifold directs air to the edges of the heated sheet to cool the heated sheet while the flexible membrane presses and rolls the heated sheet against the rigid mold.

In one preferred aspect, the manifold comprises an annular conduit having a plurality of openings for directing air to the heated sheet. Furthermore, the manifold may comprise an internal manifold which is positioned between the rigid mold and the conformable pressing assembly. In another preferred form, the manifold comprises an external manifold and includes a baffle plate to direct the air between the rigid mold and the conformable pressing assembly to cool the heated sheet held therebetween.

According to yet another aspect, a bending and tempering apparatus includes a rigid mold and a flexible diaphragm. The rigid mold includes a molding surface having a first thermal conductivity and heat capacity in a central portion for cooling the central portion of a heated sheet and a second thermal conductivity and heat capacity in a peripheral portion of the molding surface for cooling the perimeter of the heated sheet, wherein the first thermal conductivity and heat capacity is less than the second thermal conductivity and heat capacity to thereby cool the perimeter of the heated sheet at a faster rate than the central portions of the heated sheet. The flexible diaphragm is pressurized by an incompressible fluid to form a convex shape for pressing and rolling the heated sheet of glass onto the molding surface.

In a preferred aspect, the rigid mold includes an insert defining the second thermal conductivity and heat capacity to withdraw heat from the edge of the bent glass at a faster rate than from the central area of the glass. The heat from the edge of the glass sheet can be withdrawn at a rapid rate using several methods. The insert may comprise a material selected from the group consisting of copper, silver, aluminum, molybdenum, titanium, steel, uranium, metal alloys, diamond, composites, and boron nitride.

In another preferred aspect, the insert is adapted to hold a fluid, wherein the evaporation of the fluid removes heat from the heated sheet of glass. The rigid mold may include a conduit for delivering the fluid to the insert so that when the insert comes in contact with the perimeter of the heated sheet and the fluid evaporates, the fluid is replenished through the conduit. The molding surface may include a groove for receiving and holding the insert. In one aspect, the insert comprises a silicone open cell sponge material.

In other aspects, the rigid mold may comprise a material selected from the group consisting of silver, copper, aluminum, molybdenum, uranium, metal alloys, composites, diamond, and boron nitride. In another aspect, the mold may include a layer of material selected from the group consisting of silver, copper, aluminum, molybdenum, uranium, titanium, steel, metal alloys, diamond, composites, and boron nitrite wherein the layer defines the molding surface.

In yet another aspect of the invention, a method of bending and tempering a sheet of glass includes the steps of heating the sheet of glass to a formable state, rolling the heated sheet onto a rigid mold, and cooling the heated sheet while it is being rolled onto the rigid mold. The step of rolling the heated sheet preferably includes rolling the heated sheet from the central portion of the sheet to the perimeter portion of the heated sheet.

In this aspect of this invention, the step of heating includes the step of heating the central portion of the sheet of glass to a higher temperature than the perimeter of the sheet of glass in order to achieve a temperature differential in the sheet, which may be achieved by masking the perimeter of the sheet during heating.

In another aspect, the heated sheet of glass may be pre-bent before rolling the heated sheet of glass onto the rigid mold. The step of pre-bending may include holding the sheet of glass in a holder having a molding surface while the sheet of glass is being heated so that the heated sheet of glass at least partially conforms to the molding surface of the holder. In this manner, the mechanical stress of bending is greatly reduced in the bending and tempering process. The heated sheet of glass may conform to the molding surface of the holder under the force of gravity.

In yet further aspects, the perimeter of the heated sheet of glass is cooled at a faster rate than the central portions of the heated sheet of glass, which can be accomplished by directing air to the perimeter of the heated sheet while the sheet is being rolled onto the rigid mold. Furthermore, the rigid mold may be cooled to thereby increase the transfer of heat from the heated sheet to the rigid mold. Similarly, the flexible membrane may be cooled while the flexible membrane is pressing against the heated sheet to thereby cool the heated sheet of glass.

Several advantages of the present invention are apparent from the preceding summary. By providing a conformable pressing member, the second rigid mold assembly of a conventional apparatus is eliminated, thus eliminating the attendant problems with and limitations of a two-part, rigid mold, bending and tempering apparatus and method. Furthermore, the conforming pressing apparatus may be used to bend and temper glass products of varying thickness and dimensions. In the conventional two-part rigid mold assembly, both rigid molds must be customized for sheets of different thickness and dimensions. Because of the flexible, conformable characteristics of the conformable pressing element, the rigid mold is not subject to damage if a foreign object is inadvertently left in the bending apparatus. Moreover, the placement of the heated sheet between the rigid mold and the conformable pressing element is provided with a far greater tolerance than the two-part rigid mold apparatus. In a conventional apparatus and method, the heated sheet of rigid material must be precisely positioned between both rigid mold parts; otherwise, the sheet may break or have a far smaller quality area due to increased offset buckling. Therefore, the present invention also eliminates process control steps and their corresponding monitors or sensors, which would otherwise be needed to provide feedback or input. Also, the need for precise mold alignment is eliminated, and the applied pressure is totally controllable during bending, is uniform in a radial sense, and spatially uniform after bending.

Other advantages of the present invention include providing a combined bending and tempering apparatus which may be used to bend and temper thin sheets of glass, such as glass sheets having a nominal thickness of less than 3 mm or of 1.7 mm or less. By bending the heated sheet with a conformable pressing element, an air manifold for supplying the air can be positioned internally within the bending apparatus to achieve a relatively simultaneous bending and tempering of the glass. Contact tempering and bending is achieved by providing a rigid mold and a conformable pressing element that are adapted to have higher thermal conductivity at their respective peripheral regions for contacting the edge of the sheet to thereby increase the cooling of the edge and induce a temperature differential across the heated sheet to temper the sheet of glass.

These and other objects, advantages, purposes and features of the invention will become more apparent from a study of the following description taken in conjunction with the drawings.

BRIEF DESCRIPTION OF THE DRAWINGS

FIG. 10 is a cross-sectional view similar to FIG. 4 illustrating a second embodiment of the glass bending apparatus in which the glass sheet is pressed and rolled against a rigid female mold;

FIG. 11 is a cross-sectional view of a second embodiment of the holder assembly having a concave support surface;

FIG. 12 is a cross-sectional view taken along line XII—XII of FIG. 11;

FIG. 13 is a cross-sectional view similar to FIG. 12 illustrating another embodiment of the support surface;

FIG. 18 is a fragmentary, enlarged view of a portion of the glass bending and tempering apparatus of FIGS. 16 and 17 showing the conformable membrane pressing against the glass sheet and conforming to the air manifold;

FIG. 19 is a cross-sectional view of the rigid mold assembly similar to FIGS. 15–17 illustrating a third embodiment of the manifold;

FIG. 20 is a cross-sectional view similar to FIG. 19 illustrating a further embodiment of the rigid mold assembly, the molding surface of the rigid mold including an insert;

DETAILED DESCRIPTION OF THE PREFERRED EMBODIMENTS

Bending Apparatus and Method

Figure 1:
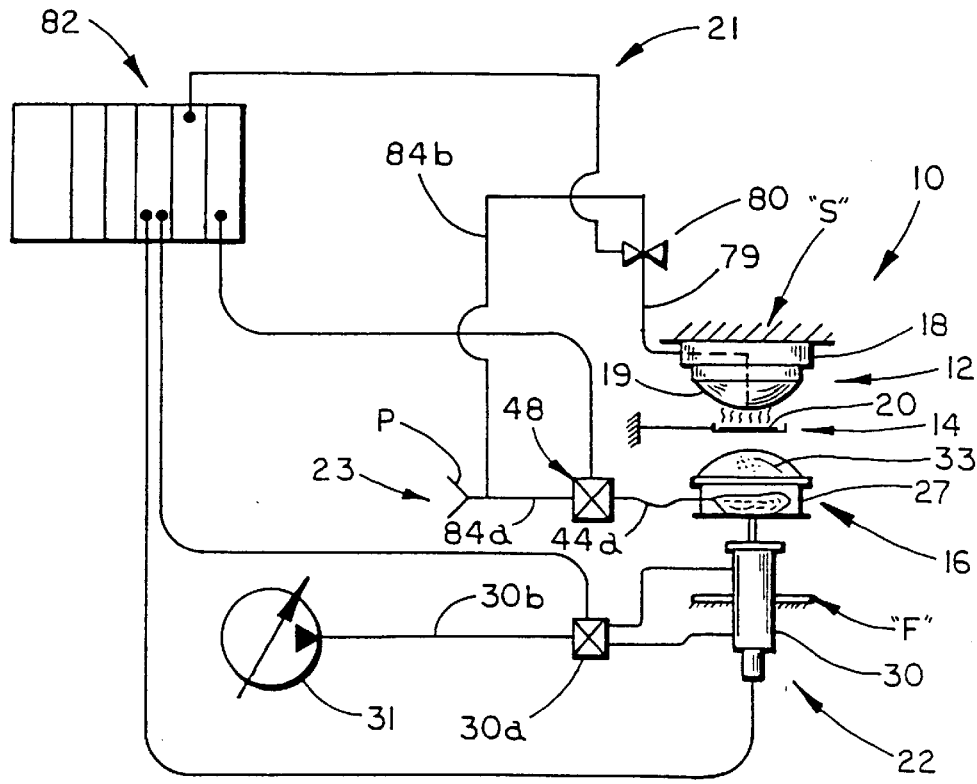
FIG. 1 is a schematic view of a first embodiment of the glass bending apparatus and the control system of the present invention.
Figure 2:
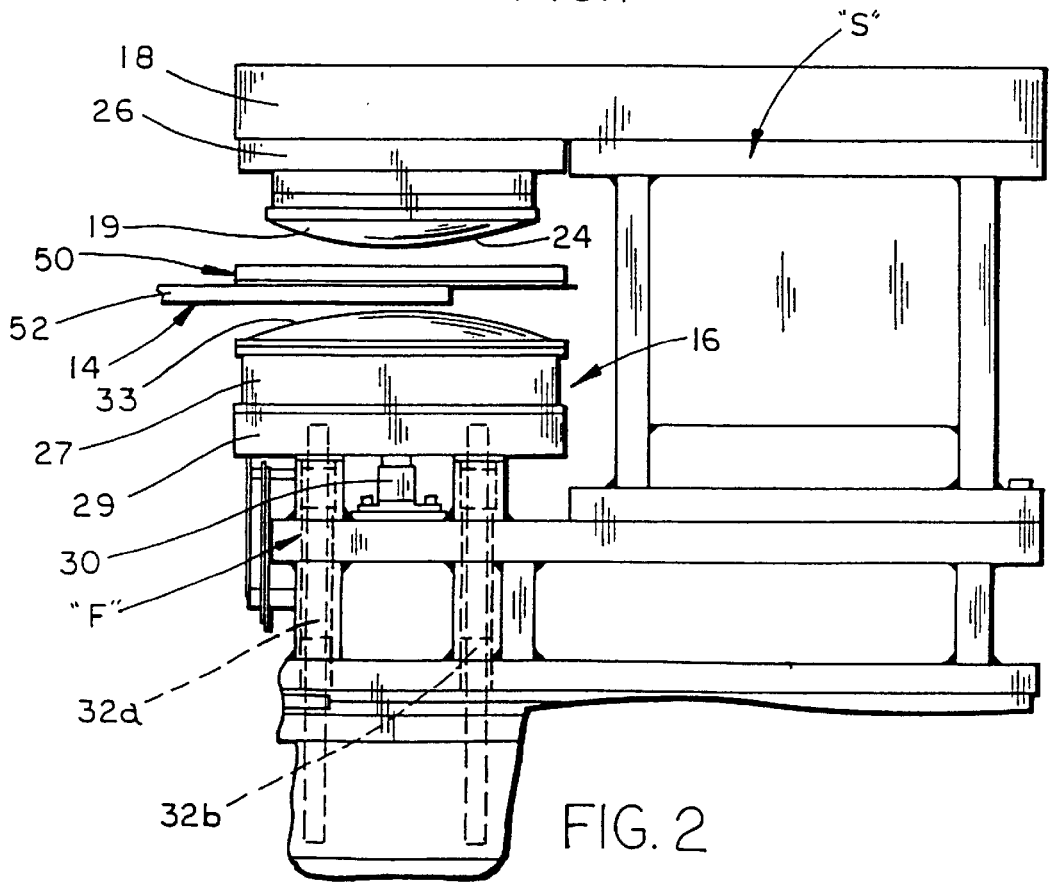
FIG. 2 is a side elevational view of the embodiment of the glass bending apparatus shown in FIG. 1 illustrating the carrier assembly positioned between the rigid mold assembly and a conformable membrane assembly in a holding position.
Figure 3:
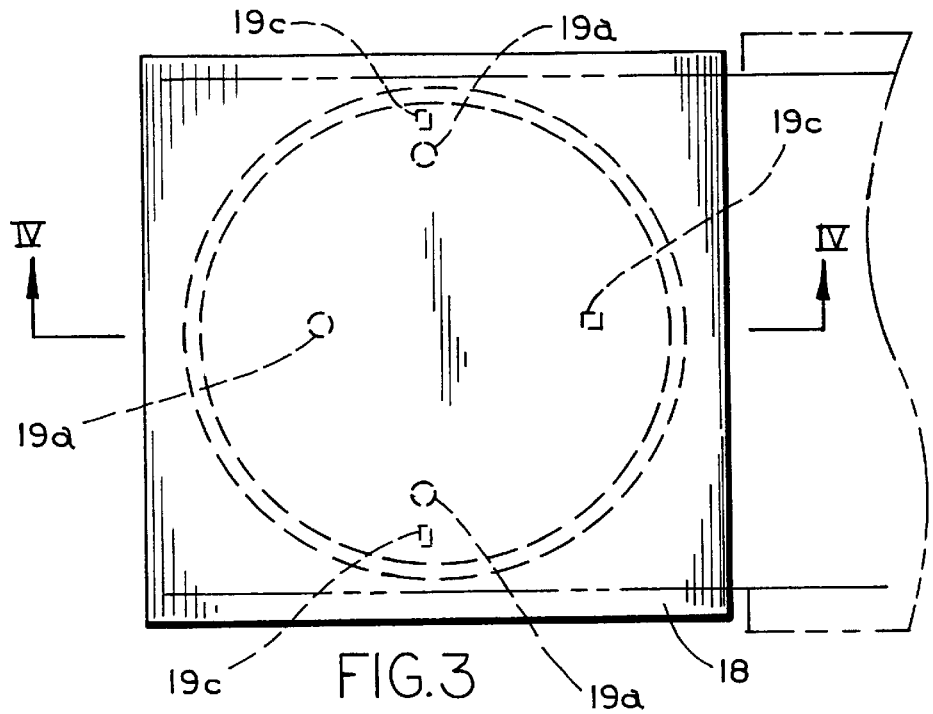
FIG. 3 is a top plan view of the molding apparatus.

Referring to FIG. 1, a bladder-molding apparatus 10 in accordance with the present invention is shown in a holding position. The bladder-molding apparatus 10 includes a rigid mold assembly 12, a carrier or holder assembly 14, and a conformable pressing assembly 16. The rigid mold assembly 12 includes a press frame 18, which is supported on a rigid support structure S, and a rigid mold 19 supported from the press frame 18 on to which a sheet 20 heated to a formable state such as glass, plastic/resinous polymeric material, viscoelastic material, thermoplastic material, or other formable material, is pressed and rolled by conformable pressing assembly 16. The operation of the bladder-molding apparatus is controlled by a control system 21 through a drive system 22 and a pressure system 23, as will be more fully described.

As is best seen in FIGS. 2–6, in one preferred embodiment the rigid mold 19 preferably comprises a generally solid male mold formed from a material with a high coefficient of thermal conductivity. Alternatively, the rigid mold may comprise a rigid female mold, as will more fully described below in reference to FIG. 10, or a mold with a surface having a complex curvature. Preferably, rigid mold 19 comprises a generally solid aluminum or aluminum alloy mold having a smooth, convex outer surface 24 on which the heated sheet 20 is rolled, as will be explained in more detail below. The term convex as used in this specification includes curved or radiused, spherical and multi-radiused curved surfaces. Rigid mold's 19 molding surface is preferably covered by a high temperature fabric/cloth 54 as will be explained below. Cloth/fabric 54 is held in place by a band clamp 17, such as a large hose clamp, which extends over the perimeter of fabric/cloth 54 and around a groove 17a of mold 19 to thereby secure fabric/cloth 54 to mold 19. Rigid mold 19 is supported by press frame 18 on a cooling plate 26. Cooling plate 26 operates as a heat sink for rigid mold 19. Cooling plate 26 preferably comprises an aluminum or metal plate with transverse passages to accommodate the flow of cooling fluid, which cools cooling plate 26 and rigid mold 19 primarily by thermal conduction. The final shape of the bent material is determined by the rate of cooling from the top surface to the bottom surface of the material during pressing and cooling below the strain point of the material. By varying the temperature of the top mold, the shape of the part can be varied. This process becomes stable when the system has reached equilibrium temperature. If the mold is too cold, condensation will occur. Condensation can cause glass breakage. Consequently, the temperature of the mold and the cooling plate should be above the dew point of the surrounding air. Preferably, cooling plate 26 cools rigid mold 19 to maintain the temperature of the rigid mold between about 40 degrees F and 120 degrees F. More preferably, cooling plate 26 cools rigid mold 19 to maintain the temperature of the rigid mold between about 80 degrees F and 120 degrees F. Most preferably, cooling plate 26 cools rigid mold 19 to about 100 degrees F.

Conformable pressing assembly 16 is adapted to extend and press a heated sheet of formable material, such as glass, plastic/resinous polymeric material, viscoelastic material, thermoplastic material, or other formable material, against the rigid mold 19. As best shown in FIGS. 2–6, conformable pressing assembly 16 comprises an open ended bladder frame 27 which is extendably supported on a rigid frame F. Opened ended bladder frame 27 is formed from a cylindrical wall 28 that is welded or otherwise secured to the die plate 29. In order to extend conformable pressing assembly 16, die plate 29 is extendably supported on a frame F by a power cylinder 30, which is extended and withdrawn to move conforming pressing assembly 16 from a holding position to a pressing position. Cylinder 30 is preferably a hydraulic cylinder with an integral position sensor, available from PARKER HANNIFIN in DesPlaines, Ill. Cylinder 30 is connected by a valve 30a and a conduit 30b to a hydraulic supply 31 (FIG. 1). Alternately, cylinder 30 may comprise a pneumatic cylinder, a ball screw driven cylinder including, for example, a servo motor, or the like. Die plate 29 is stabilized on the frame F by a pair of extendable guides 32a and 32b (FIGS. 2 and 4–6), which extend through frame F as the conformable pressing assembly 16 is raised or lowered by cylinder 30.

Figure 4:
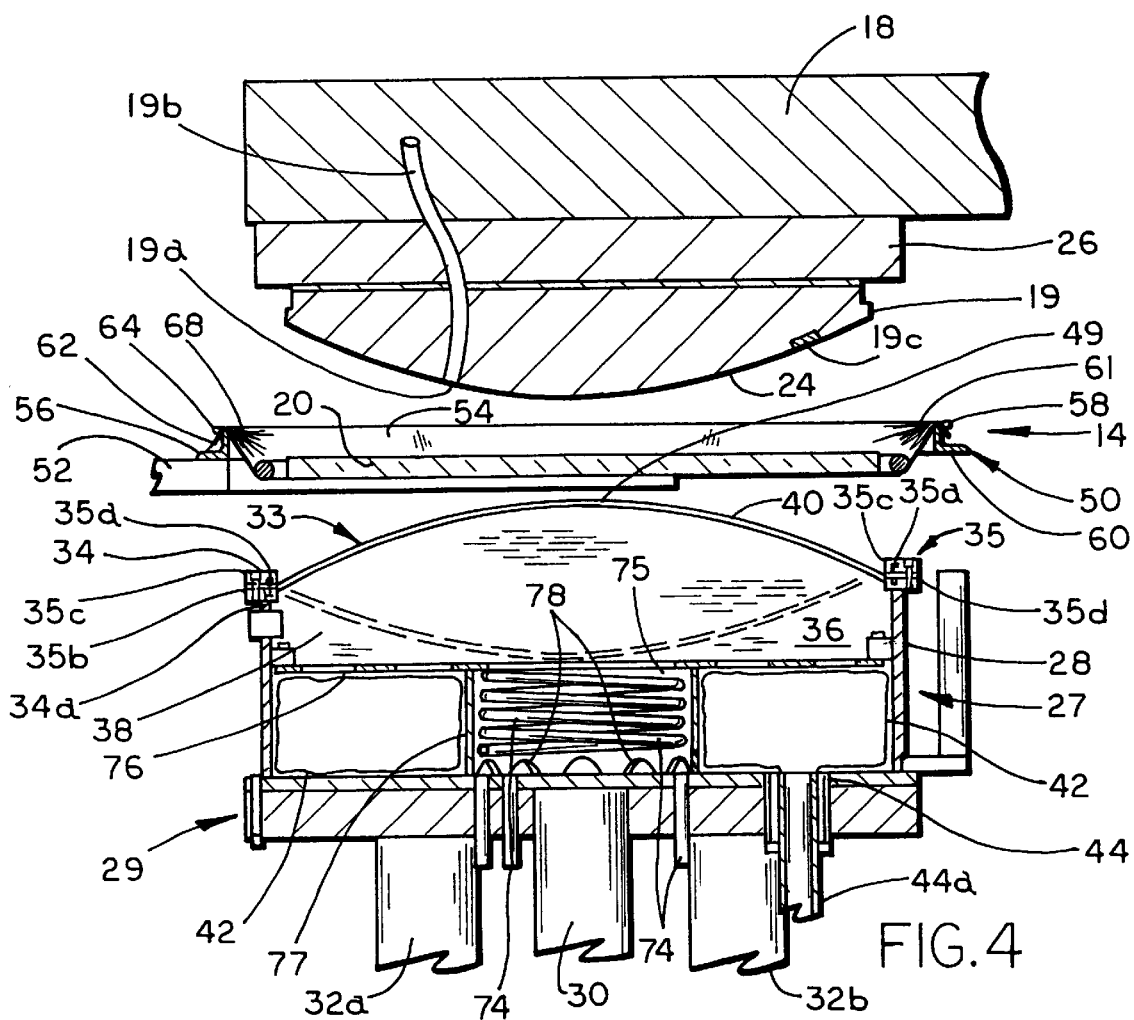
FIG. 4 is a cross-sectional, front elevational view of the glass bending apparatus, taken across line IV—IV of FIG. 3, illustrating the conformable membrane assembly with a flexible conforming membrane extended ready for pressing.

As best seen in FIG. 4, a flexible, conformable membrane 33 extends over and is secured to the perimeter 34a of an open end 34 of the frame 27 by an annular gripping element or clamp 35 that is preferably welded to the entire perimeter of cylindrical wall 28. Membrane 33 may comprise a silicone rubber material and operates like a diaphragm, flexing in (dotted lines in FIG. 4) and out (solid lines in FIG. 4) of the open end of frame 27 in response to the pressure applied from fluid 38 in the chamber 36, as explained below. Also, membrane 33 is preferably covered by a high temperature fabric or cloth 54 which may be secured to the frame along with membrane 33, as will be described below. In its extended position, membrane 33 assumes a convex upper surface 40 for rolling the sheet 20 onto the rigid mold 19 as will be more fully explained. Preferably, membrane 33 is a polymeric/fiberglass laminate with a thermal conductivity within the range of between about 2960 and 0.03 BTU in./hr. ft$^2$ ° F., can withstand a temperature greater than 500 ° F., and has a durometer hardness reading within the range of between about 45 and 80 Shore A. More preferably, membrane 33 is a polymeric/fiberglass laminate with a thermal conductivity within the range of between about 3 and 1 BTU in./hr. ft$^2$ ° F. and a durometer hardness reading within the range of between about 67 to 79 Shore A. Most preferably, membrane 33 is a polymeric/fiberglass laminate with a thermal conductivity of at least 1.9 BTU in./hr. ft$^2$ ° F. and a durometer reading of at least 20 Shore A. Moreover, the range of the thickness of membrane 33 is preferably about 0.025 mm to 10 mm thick. More preferably, membrane 33 is about 1.5 mm to 3.5 mm thick. Most preferably, membrane 33 is about 1.59 mm thick.

Figure 4A:
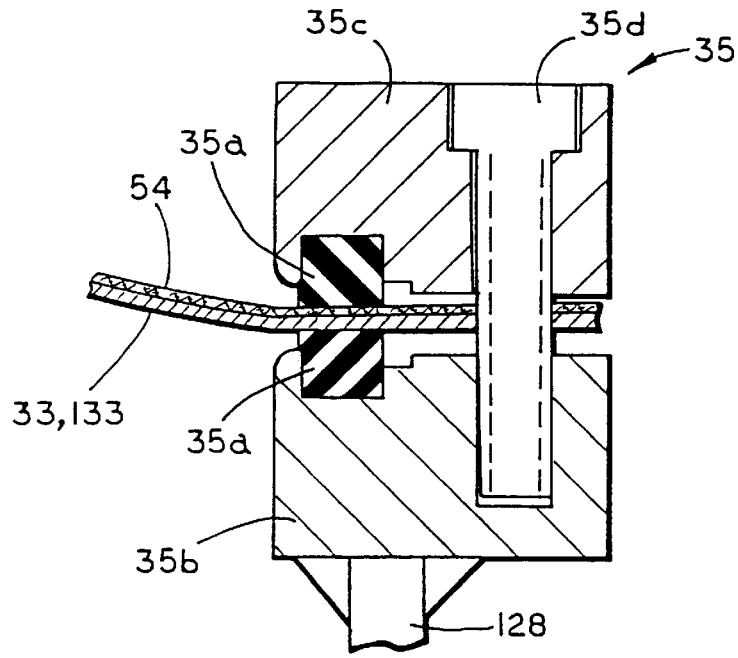
FIG. 4A is an enlarged detailed view of a gripping member holding the flexible conforming membrane.
Figure 5:
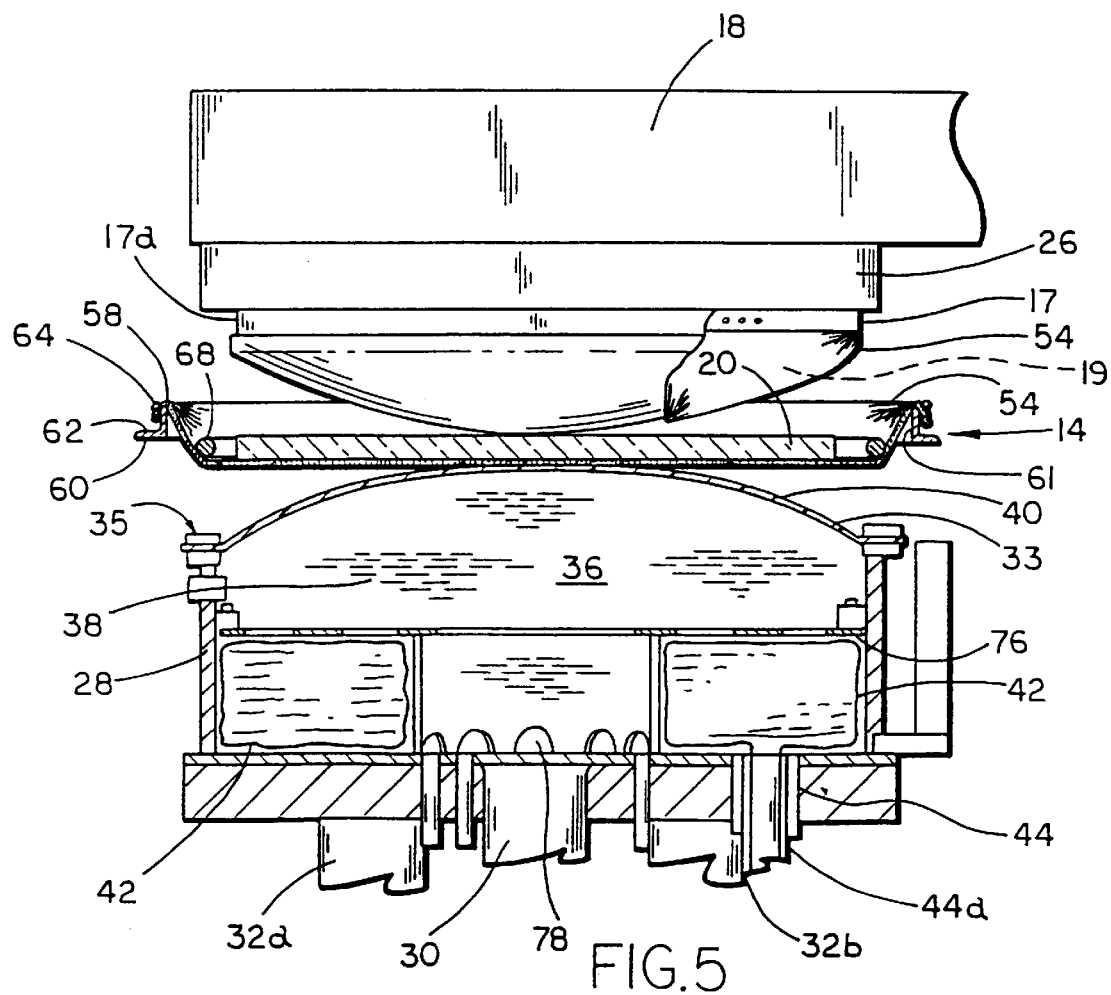
FIG. 5 is a cross-sectional, front elevational view of the glass bending apparatus, similar to FIG. 4 illustrating the assembly with the flexible, conformable membrane pressing the center of the heated sheet of glass under the rigid mold.

Cylindrical wall 28, die plate 29, and membrane 33 define a chamber 36. Chamber 36 is made air tight by welding cylindrical wall 28 to die plate 29 and by a pair of continuous, o-rings 35a in gripping member 35 which provide a seal between membrane 33 and gripping member 35 (FIG. 4 and 4A). Gripping member 35 includes a lower ring 35b welded to the top edge of wall 28 and a groove in its upper surface in which one o-ring 35a is seated. An upper ring 35c has a groove in its lower surface in which the other o-ring 35a is seated. Upper and lower rings 35b, 35c are clamped together and held by a series of spaced screws 35d with the periphery of membrane 33 held therebetween.

Chamber 36 preferably holds a substantially incompressible fluid 38, such as water, that is pressurized to inflate or press on the membrane 33. Fluid 38 is pressurized by an annular, donut shaped inflatable bag/ bladder 42, such as an air bag, that is positioned in chamber 36. Bag 42 is flexible and may be formed from urethane covered nylon and is inflated or deflated with a compressible fluid, such as gaseous air, to increase or decrease the pressure of fluid 38 in the chamber 36 through tubing 44a which communicates with bag 42 through a port 44 in the frame 27. As best seen in FIG. 1, tubing 44a connects the bag 42 to a plant air supply P through the control system 21. The air entering port 44 is preferably regulated by control system 21 through a valve 48. Valve 48 is preferably a proportional valve which operates as a pressure regulator to release the pressure in the air bag 42 when the pressure in the fluid 38 exceeds a desired maximum level and permits air to enter into the air bag 42 when the pressure in the fluid 38 falls below the desired pressure. Valve 48 is most preferably a pneumatic proportioning valve, series DFT also available from PARKER HANNIFIN.

The combination of the conformable membrane 33 and the generally constant pressure in the fluid 38 allows the membrane 33 to roll from the central portion of the sheet 20 to the sheet's perimeter to generally conform to the molding surface of the rigid mold 19. This rolling action significantly reduces the buckling that is associated with conventional glass bending methods and, consequently, increases the size of the quality zone. By rolling from the central portion of the heated sheet 20, the excess material, which is inherent in the bending of a heated, softened sheet of material, moves from the sheet's center to the sheet's perimeter. The length and extent of the buckles are significantly reduced. Also, any buckles which are formed are positioned toward the perimeter. While this method still induces some buckling in the sheet of rectangular glass, the buckles are smaller in depth and length and the size of the quality area is increased significantly. For example, on a sheet with dimensions of 10.5 by 8.5 inches, and the size of the quality area is increased by about ½ inch on each edge.

In another preferred embodiment, a bladder-molding apparatus 110 is shown in FIG. 10 and includes a rigid mold assembly 112, a carrier or holder assembly 114, and a conformable pressing assembly 116. The rigid mold assembly 112 includes a press frame 118, which is supported on a rigid support structure S, and a rigid mold 119 supported from the press frame 118 on to which heated sheet 20 is pressed and rolled by conformable pressing assembly 116. The operation of and hardware for operating bladder-molding apparatus 110 is similar to the operation of bladder-molding apparatus 10; therefore, reference is made to bladder-molding apparatus 10 for the details of the control system and hardware. As best seen in FIG. 10, the rigid mold 119 preferably comprises a generally solid female mold formed from a material with a high coefficient of thermal conductivity, similar to mold 19. Preferably, rigid mold 119 comprises a generally solid aluminum mold having a smooth, concave outer surface 124 on which the heated rigid sheet 20 is rolled, as will be explained in more detail below. Rigid mold 119 is supported by press frame 118 on a cooling plate 126. Cooling plate 126 preferably comprises an aluminum or metal plate with transverse passages to accommodate the flow of cooling fluid, which cools the rigid mold 119 primarily by thermal conduction. Reference is made to the details of cooling plate 26 as cooling plate 126 operates in a like manner to cooling plate 26.

Conformable pressing assembly 116 is adapted to extend and press a sheet of material heated to a formable state, such as glass plastic/resinous polymeric material, viscoelastic material, thermoplastic material, or other heated formable material, or the like, against the rigid mold 119. As best shown in FIG. 10, conformable pressing assembly 116 is of similar construction to conformable pressing assembly 16; therefore, reference is made to conformable pressing assembly 16 for the overall details and manner of operation of conformable pressing assembly 116. A flexible, conformable membrane 133 extends over and is secured to the perimeter 134a of an open end 134 of the frame 127 by an annular gripping element or clamp 135 that is preferably welded to the entire perimeter of cylindrical wall 128. Membrane 133 may comprise a silicone rubber material and operates like a diaphragm, flexing in (dotted lines in FIG. 10) and out (solid lines in FIG. 10) of the open end of frame 127 in response to the pressure applied from fluid 38 in the chamber 136. In its extended position, membrane 133 assumes a convex upper surface 140 for rolling the sheet 20 onto the rigid mold 119. However, the radius of curvature of the extended membrane 133 is generally smaller than the radius of curvature of extended membrane 33 since in the preferred manner of operation conformable pressing assembly 116 presses the central area of sheet 20 against the vertex region of the concave female mold. The term concave as used in this specification includes curved or radiused, spherical and multi-radiused curved surfaces. Reference is made to membrane 33 for details of other preferred compositions, properties, and thicknesses.

The combination of the conformable membrane 133 and the controlled pressure in the fluid 38 allows the membrane 133 to roll from the central portion of the sheet 20 to the sheet's perimeter, thus generally conforming to the molding surface of the rigid mold 119. In a similar manner to bladder-molding assembly 10, this rolling action significantly reduces the buckling that is associated with conventional glass bending methods and, consequently, increases the size of the quality zone. However, in some applications where the female mold's radius of curvature is smaller than the curvature of the inflated membrane 133, the conformable pressing assembly 116 presses on or near the perimeter of the heated sheet, rolling from the outside edge portion of the heated sheet to the center of the sheet 20. The rolling action provides a uniformity of pressure that reduces buckling in the heated sheet. Other mold shapes may provide multi-directional rolling action as the conformable membrane presses the heated sheet on the rigid mold surface, for example, a mold having an aspheric molding surface.

The female mold 119 is particularly useful when bending coated sheets of glass or other conformable material, where the coating is on the concave side of the heated sheet. Coatings can be damaged or distorted when compressed against a rigid mold; therefore, it is preferred to roll the uncoated side of the heated sheet against the rigid mold so that the coated side faces the conformable membrane 133 where the coating will not be damaged or marred by contact with the rigid mold. Furthermore, glass that is coated with an infrared reflecting coating is difficult to heat if the coating is on the top side of the sheet. Typically, the primary furnace heaters are on the top of the furnace. If the coating is on the top of the glass, most of the heat is reflected away from the glass, causing the glass to heat very slowly. A part having a coated concave side can be produced by bending the coated glass into a concave mold.

The remainder of embodiment 110 of the bladder-molding apparatus is substantially similar to that of embodiment 10 including holder 114 and the remainder of conformable pressing assembly 116.

As best illustrated in FIGS. 4–7, the carrier assembly 14 or 114 for holding the heated sheet before, during, and after bending comprises a hoop frame 50, supported by a carrier arm 52, and a flexible fabric 54 that is supported by hoop frame 50 to provide a conformable support surface for the heated sheet of glass during bending. The hoop frame 50 is preferably formed from angle steel 56. Angle steel 56 includes two substantially orthogonal legs 58 and 60, with vertical leg 58 defining the side 61 of the hoop and leg 60 defining an outwardly extending shoulder 62 around the perimeter of hoop frame 50. Flexible fabric 54 is secured to hoop frame 50 by an adjustable retaining ring/band 64 which compresses the cloth 54 against the side 61 of hoop frame 50 and may rest on shoulder 62. Retaining ring/band 64 is a metal strip, for example a stainless steel hose clamp, and includes plurality of holes or slots on one end and a connector on the other end for increasing or decreasing the diameter of the ring/band 64 to adjust the tension in the ring 64 and the compression on flexible fabric 54. A small diameter wire, for example ⅛" diameter, may be welded to the top of angle steel 56 above band 64 to prevent flexible fabric 54 from sliding.

Preferably, flexible fabric 54 comprises a flexible, stainless steel cloth. More, preferably flexible fabric 54 is a flexible stainless steel cloth, available under the trademark BEKITHERM® FA S800-316L, N. V. BEKAERT S. A. Zwevegen, Belgium. In some applications, flexible fabric 54 may comprise other flexible high temperature cloths, such as a ceramic cloth, fiberglass cloth or, felt, such as, for example Burlington Glass Fabrics Co. Rockleigh, N.J., styles 116, 7781, 1979, or 1926, or any other like insulating cloths. High temperature cloths as referenced herein generally include a material which is flexible and can withstand temperatures in excess of 620° C. Since the density and thickness of the fabric 54 controls the cooling rate of the heated sheet 20, the weave pattern, thickness, and/or density of the fabric may be varied to tailor the final shape of the bent part. Therefore, its selection depends on the thickness of the sheet being bent and the material of the sheet being bent, whether it is glass, thermoplastic, or plastic or the like. In applications requiring more accuracy, fiberglass cloths having a range of thickness may be used as an overlay on one or more of the stainless steel cloth, the rigid mold, and/or the conformable flexible membrane to vary the cooling rate of the sheet and provide a smoother surface on which the sheet may rest. In glass bending applications, conformable membrane 33 preferably includes a layer of high temperature cloth in order to protect the membrane from the high temperatures associated with the bending of glass. The fiberglass cloths may range in thickness from approximately 0.005 to 0.052 inches thick.

Generally, in cylindrical glass bending, the glass will generally bend toward the side that cools slower. This also occurs, but to a lessor extent, with three dimensional glass bending. Thus, by changing the mold coverings and, hence, the rate of cooling, one can affect the shape of the bent product. The shape of the glass can be fine tuned by adjusting the top to bottom cooling rates. The material type and thickness of the mold coverings vary greatly with the type of product one is trying to bend. The type of bend, two dimensional or three dimensional, sheet size, sheet thickness, product shape, and coatings will influence what type of mold coverings are used. Table 1 illustrates several specific examples of combinations of high temperature fabrics used with the bladder-bending apparatus of the present invention. For example:

TABLE 1

| COVERINGS | AVERAGE RADIUS | MAXIMUM RADIUS | MINIMUM RADIUS |
| --- | --- | --- | --- |
| Top Mold/#1 Cloth, Bottom Bladder/#2 Cloth | 22.8 in. | 23.4 in. | 21.6 in. |
| Top Mold/#3 Cloth, Bottom Bladder/#3 & #2 Cloth | 24.1 in. | 27.6 in. | 21.8 in. |

Cloth #1 = BFG Style 1926, Burlington Glass Fabrics Co. Rockleigh, New Jersey
Cloth #2 = Siltemp HT52, Ametek Haveg Div. Wilmington DE.
Cloth #3 = Bekitherm FA S800-316, N. V., Bekaert S. A. Zwevegen, Belgium
Note: The glass used in these examples was heated to about 1,235° F. and had dimensions of 12.3125" × 9.1875" × 0.120" and was bent on a 22.6" spherical radius male mold. Eighteen readings were taken per part using a standard 1.5" chord length radius gauge. In the second example, the #2 cloth was outermost and contacted the heated glass.

In one preferred embodiment, carrier assembly 14 also includes a weight 68 to flatten the holding surface 70 of flexible fabric 54. Weight 68 preferably comprises a ring of dense material such as steel or other metal, and sits on fabric 54 between the sides 61 of the hoop frame 50 adjacent the periphery of the heated sheet. Preferably, weight 68 is adjacent the inner perimeter of hoop frame 50. Most preferably, weight 68 comprises a stainless steel ring 72. The diameter of the ring 72 may be sized to fit in the hoop frame 50 immediately adjacent sides 61 so that the fabric 54 is pulled nearly flat and supported in a generally planar position and the holding surface area 70 is maximized. By maintaining the heated sheet 20 flat before bending, the heated sheet 20 will not slump or start to bend significantly before it is rolled against the rigid mold 19 and will not develop the buckles that are associated with slump bending.

In another preferred embodiment of carrier assembly 14', shown in FIGS. 11–13, flexible fabric 54' may comprise a formable, stretched stainless steel mesh cloth or perforated metal sheet 54a', which is formed close to the desired final bent shape of the sheet 20. A suitable fabric is 304 SS 26 GA. $\frac{5}{32}$" hole diameter, $\frac{3}{16}$" staggered pattern from Ferguson Perforating & Wire Co., Providence R.I. In this manner, the support surface for the sheet 20 is non-planar and heated sheet 20 slumps to the shape of the fabric 54'. Preferably, the support surface is generally concave. Furthermore, fabric 54' may include a layer of high temperature cloth 54b', which overlays the metal mesh cloth layer and forms a contact surface on which heated sheet 20 is placed (FIG. 12).

As described above in reference to cooling plate 26, 126 in the first mold assembly 12, 112 and the cooling properties of the high temperature cloths 54, the bending process includes a cooling step. The cooling process assures that once the sheet has achieved its desired shape, it is cooled sufficiently to maintain its shape. Therefore, like the rigid mold assembly 12 and the carrier assembly 14, the conformable pressing assembly 16 also includes a device for cooling. Preferably the cooling device comprises cooling coils 74 or 174 (FIGS. 4 and 10) which are positioned in chamber 36 or 136 to cool fluid 38 and, ultimately, membrane 33 or 133. Coils 74, 174 extend exteriorly of the chamber to connect to a coolant water supply (not shown). Coolant water is flushed through coils 74 or 174, entering coils 74 or 174 from an inlet side of the coils and discharging from an outlet side of the coils. Since coils 74 or 174 are immersed in fluid 38, the heat from fluid 38 is absorbed by the coolant water in the coils, which is then discharged at the outlet side of the cooling coils. This continual flushing of coolant water through coils 74 or 174 draws the heat from fluid 38, which draws heat from membrane 33 or 133, and maintains the temperature of fluid 38 in the chamber 36 or 136 to a range of 70 degrees F to 120 degrees F. Most, preferably, the temperature of fluid 38 is maintained between 90 degrees F and 100 degrees F. Consequently, fluid 38 serves two functions—it both inflates and cools membrane 33 or 133.

Cooling coils 74, 174 are housed in a compartment 75 of chamber 36, 136 below a perforated holding plate 76, 176. Holding plate 76, 176 is provided to contain air bag 42 or 142 in the lower portion of chamber 36 and prevent air bag 42, 142 from floating up into the upper portion of chamber 36 and interfering with the functions of fluid 38 of inflating and cooling membrane 33. Plate 76, 176 is supported from the interior of cylindrical wall 28 and by a cylindrical, vertical partition wall 77, 177, which extends below plate 76, 176 to die plate 29, 129. Preferably, plate 76, 176 is positioned below the fully flexed, downward position of membrane 33. As shown, holding plate 76, 176 is circular and conforms to the inner perimeter of cylindrical wall 28 or 128 and is supported by bolts 26a or 126a which extend through flanges 26b or 126b (FIG. 6) provided on the interior surface of cylindrical wall 28 or 128. However, plate 76, 176 may also comprise a multi-sided shape plate, such as a square, hexagon, or octagon plate. Yet, the closer the plate 76, 176 conforms to the inner perimeter of the cylindrical wall, the smaller the gap between the plate 76, 176 and the cylindrical wall 28 or 128 and the less likely that the air bag 42, 142 will interfere with pressurization and cooling of membrane 33, 133. To assure that the fluid in chamber 36 or 136 can flow freely through chamber 36 or 136, partition wall 77, 177 is provided with a plurality of apertures 78, 178. Apertures 78, 178 permit the fluid 38 to flow through chamber 36 or 136 and compartment 75 or 175 so that air bag 42, 142 can pressurize fluid 38. Furthermore, apertures 78, 178 permit fluid 38 to circulate adjacent cooling coils 74, 174. As shown, apertures 78, 178 are semi-circular, but may comprise any geometric shape. It should be understood from the description, that the vertical nature of cooling coils 74, 174 causes the fluid 38 in chamber 36 or 136 to move in a circular pattern around coils 74, 174 giving a convective cooling to fluid 38.

Preferably, fluid 38 cools membrane uniformly so that rigid sheet 20 is similarly uniformly cooled. Therefore, the process control steps preferably include the step of removing air bubbles from fluid 38. Air bubbles typically result from dissolved gases in the fluid being released by the heat from the heated sheet of glass 20. As best seen in FIG. 10 in reference to the second embodiment to the bladder-molding apparatus, air bubbles generally collect at or near the apex of membrane 133 and, therefore, may form undesirable thermal discontinuities in membrane 133 and, consequently, form undesirable stress marks in heated sheet of glass 20. The air bubbles may be removed by a conduit 79a. Conduit 79a is preferably a flexible tube that can move as the pressure of the conformable pressing assembly 116 increases and as membrane 133 is compressed so that it does not interfere with the bending process. Conduit 79a is suspended in fluid 38 by a flotation device 79b, such as a float formed from a low density material, such as cork. Conduit 79a extends exteriorly of chamber 136 to vent the gas in the bubble through a valve 79c. In addition or alternatively, an air absorber solution may be added to fluid 38 to absorb the gas or gases in fluid 38. For example, an additive may comprise air absorber solution WATERWORTH HUSHH-HHH (T.M.) available from Waterworth, Lawndale, Calif., which keeps the air in solution. The conduit 79a with float 79b and/or air absorber solution may be used with all embodiments of the bladder-bending method and apparatus, including apparatus 10.

As best seen in FIG. 4, rigid mold 19 includes an aperture 19a, which communicates through a passageway 19b formed in rigid mold 19 and cooling plate 26 with a plant air supply, P. Preferably, the flow of air from plant air supply P is regulated through a valve 80 (FIG. 1) and controlled by control system 21. The flow of air from aperture 19a is used to break a vacuum which typically develops between the mold and the sheet during the bending process. In this manner, the air provides a release mechanism for the heated sheet after bending. Furthermore, in addition to directing air between rigid mold 19 and heated sheet 20, aperture 19a provides a thermal discontinuity in the rigid mold 19. This thermal discontinuity forms a stress mark on the heated sheet, which is particularly useful and desirable in aspherical or cylindrical bends. Preferably, aperture 19a is aligned along an axis of bending to provide a stress mark that can function as a reference mark. In addition, or alternatively, at least one insert 19c may be provided in rigid mold 19 to form another thermal discontinuity in the rigid mold 19. Furthermore, insert 19c may be positioned along an axis of bending. Insert 19c preferably is formed from material having a coefficient of thermal conductivity that is different than the coefficient of thermal conductivity of the rigid mold—it can either be greater or less than the coefficient of the thermal conductivity of the rigid mold. Preferably, the coefficient of thermal conductivity is within the range of between about 99⁺ and 75 percent greater or less than the thermal conductivity of the rigid mold. More preferably, the coefficient of thermal conductivity is within the range of between about 99⁺ and 90 percent greater or less than the thermal conductivity of the rigid mold. Most preferably, the coefficient of thermal conductivity is within the range of between about 99⁺ and 98 percent greater or less than the thermal conductivity of the rigid mold. For instance, insert 19c may comprise a ceramic material. More preferably, insert 19c is copper, which has a coefficient of thermal conductivity that is greater than that of the preferred aluminum mold. Of course, other materials could also be used such as silver. Most preferably, the thermal discontinuity comprises an air hole. Where more than one thermal discontinuity is provided, inserts 19c and/or apertures 19a may be aligned along more than one axis of bending. In this manner, the stress marks in the sheet 20 may be used to locate the sheets axes of bending, and can be used in cutting the bent sheet 20 to size. As will be apparent, aperture 119a conduit 119b and/or inserts similar to inserts 119c may be used with female mold embodiment 10 in the same manner.

Figure 6:
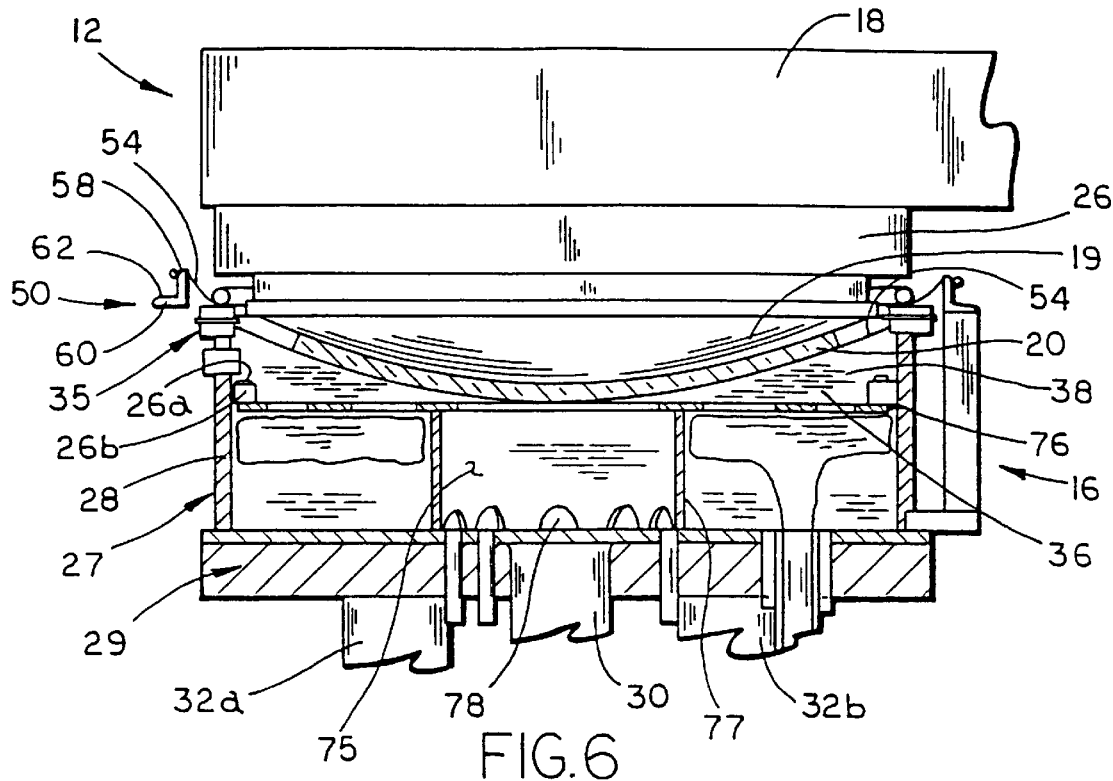
FIG. 6 is a cross-sectional front elevational view of the glass bending apparatus similar to FIG. 4, illustrating the assembly with the flexible conformable membrane conforming to the shape of the rigid mold at the end of the pressing cycle.
Figure 7:
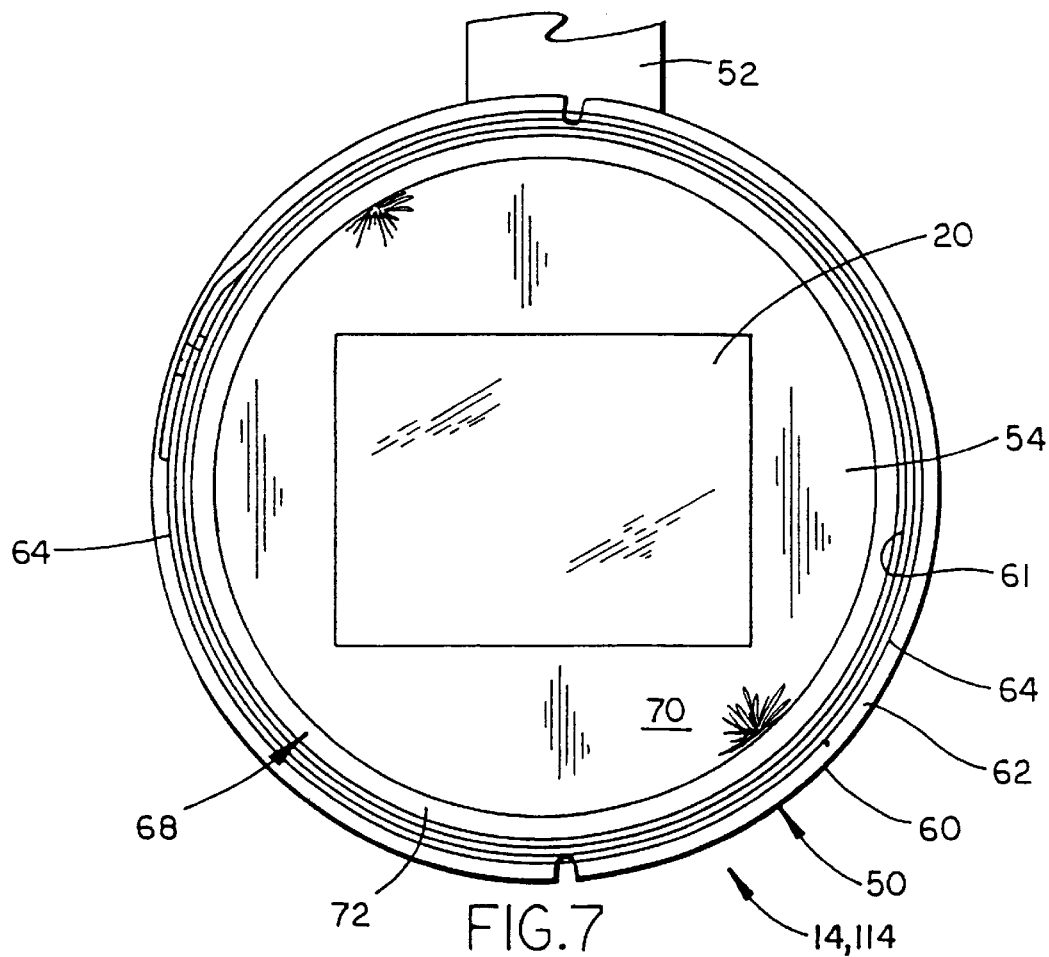
FIG. 7 is a top plan view of a holder for holding a sheet of heated glass between the rigid mold and conformable membrane.

Control system 21 includes a control unit 82 which actuates drive system 22 and the pressure system 23. Drive system 22 includes hydraulic cylinder 30 which extends and withdraws to move conformable pressing assembly 16, 116 from its holding position to its pressing position. As shown in FIG. 6, when cylinder 30 is fully extended, conformable assembly 16, 116 is in the fully conforming position wherein membrane 33, 133 completely covers sheet 20 and generally conforms to the convex, concave, or compound shape of rigid mold 19 or 119. Pressure system 23 includes the plant air supply P, valve 48, valve 80, and tubing 44a, 84a, 84b, and 79. Tubing 84a supplies the plant air to valve 48, which in turn supplies air to the air bag 42, 142 through tubing 44a in chamber 36 or 136 for inflating air bag 42, 142. When the pressure in bag 42, 142 exceeds the desired maximum pressure, for example, 4 psi, the pressure regulator valve 48 operates like a pressure relief valve and releases the pressure in the bag 42, 142. At the same time, valve 48 maintains the fluid pressure within a range of between about 15 and 2 psi. More preferably, valve 48 maintains the fluid pressure at a relatively constant pressure, for example 4 psi. Tubing 84b delivers air from plant air supply P to aperture 19a through valve 80 and tubing 79. When the bending process is complete, control system 21 activates valve 80 to deliver plant air to passageway 19b, 119b through tubing 79.

Figure 8:
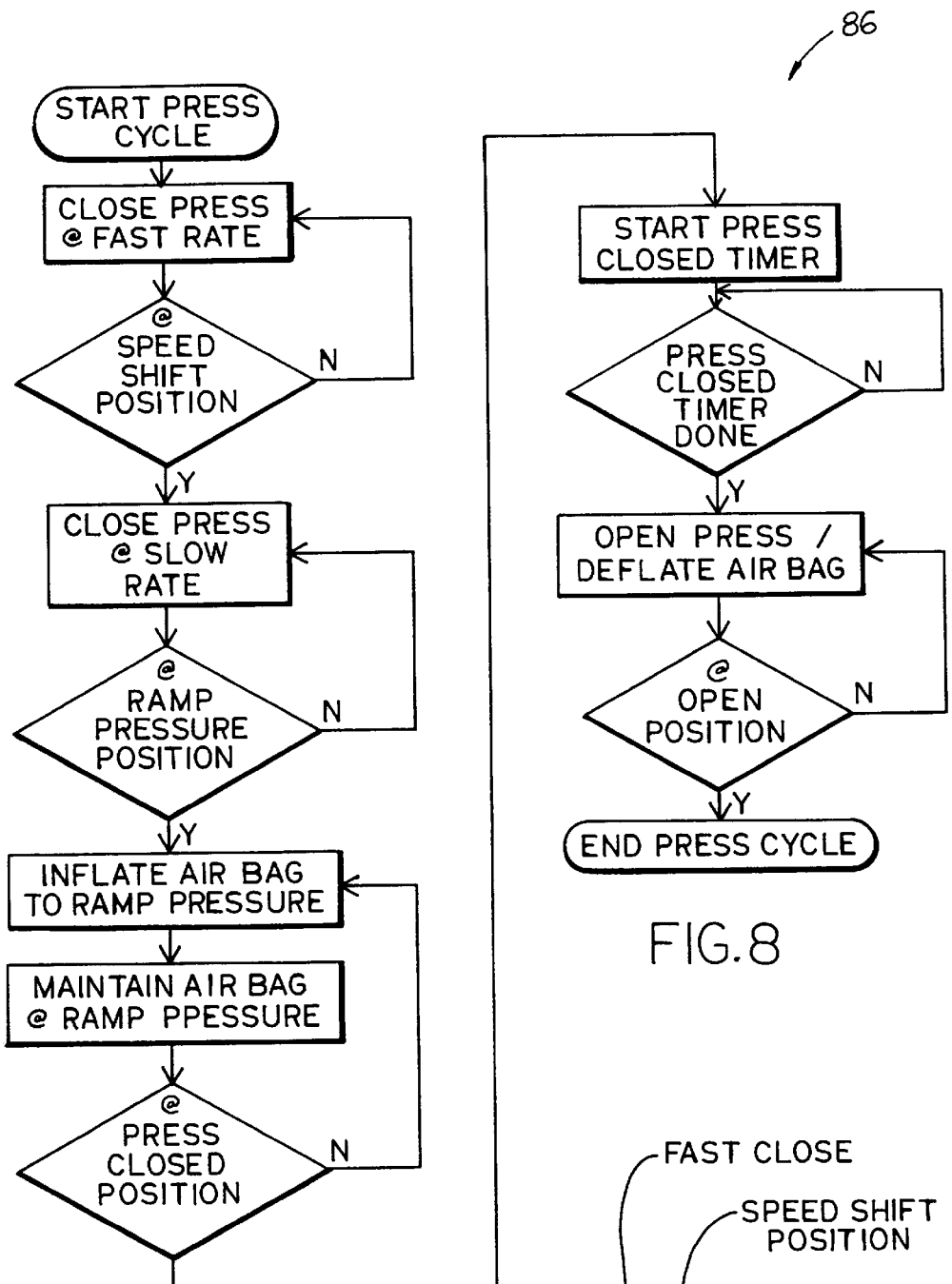
FIG. 8 is a flowchart of the software program used in the control system.
Figure 9:
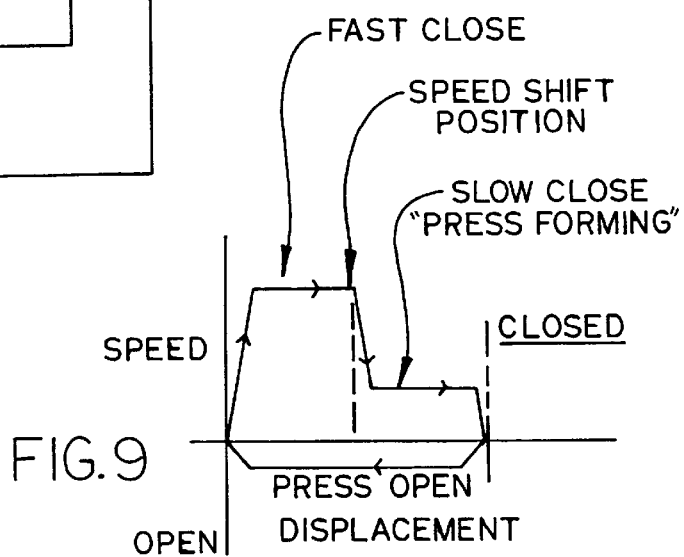
FIG. 9 is a graph of the pressure that is applied to the conformable membrane.

Control unit 28 may comprise a microprocessor or a conventional personal computer. Control unit 82 (FIG. 1) preferably comprises a programmable logic controller (PLC), model PLC-5, available from ALLEN BRADLEY in Milwaukee, Wis., which is programmed with a software program 86. Preferably the programmable logic controller includes a linear positioning module, model 1771-QB, and an analog output module, model 1771-NBVI, both available from ALLEN BRADLEY. The flow chart for the software program 86 is shown in FIG. 8. The software program 86 is a sequencing program which operates on one basic input parameter, the position of the conformable pressing assembly 16. Based on the position of the conformable pressing assembly 16, the software program selects and initiates a sequence that is preprogrammed into the PLC 82. As shown in FIG. 8, in general the first step is to activate valve 30a, which delivers hydraulic fluid to the cylinders 30 to extend the cylinder 30 at a close press fast rate until the conformable pressing assembly 16, 116 reaches a speed shift position. At the speed shift position, control system 21 actuates valve 48 to deliver air to air bag 42, 142 through tubing 44a until the pressure in the fluid 38 and bag 42, 142 reaches desired ramp pressure, for example, 4 psi. At the same time, the speed of the pressing assembly 16, 116 is slowed to a close press slow rate by reducing the flow of hydraulic fluid to the cylinder 30 through valve 30a. As the membrane 33, 133 continues to make contact and moves closer to rigid mold 19, 119, the pressure in air bag 42, 142 increases, at which point pressure regulator valve 48 discharges the air from bag 42, 142 through outlet 44 and tubing 44a to maintain the pressure in bag 42, 142 at, for example, 4 psi. When cylinder 30 reaches its full stroke position, control unit 82 actuates valve 30a to release the hydraulic pressure in cylinder 30 so that it returns to its fully withdrawn position and conformable pressing assembly 16, 116 is returned to its holding position. A graphical representation of one preferred sequence of the pressurizing and the de-pressuring of the fluid 38 is shown in FIG. 9. FIG. 9 illustrates the relationship between the position of the conformable pressing assembly 16, 116 and the speed of conformable pressing assembly 16, 116. The arrows on the graph indicate the direction of the sequence. It should be understood that this is just one form of the sequence which may be used in the bending process.

In operation, it should be understood that once heated sheet 20 is in a position between the rigid mold assembly 12, 112 and conformable pressing assembly 16, 116, control system 21 moves conformable pressing assembly 16, 116 toward rigid mold assembly 12, 112 at a first rate of speed. When the sheet is glass, it is first heated to a temperature between about 1000° F. and 1250° F. before being positioned between the mold assembly and conformable pressing assembly. Other materials are heated to a suitable temperature allowing them to be pressed and formed but not be in a molten state. Such temperature will vary with the material.

For example, a sheet of thermoplastic material may become suitably formable at 150° F. Control system 21 monitors the position of assembly 16, 116 with respect to rigid mold assembly 12, 112. When assembly 16, 116 reaches a speed shift position, the control system 21 inflates air bag 42, 142 to pressurize fluid 38 in chamber 36, 136 to the ramp pressure. The ramp pressure is preferably in the range of 2 psi to 7 psi. Most preferably, ramp pressure is in the range of approximately 4 psi to 4.2 psi. As air bag 42, 142 inflates, the pressure in the fluid 38 increases and, since fluid 38 is substantially incompressible, fluid 38 inflates the flexible membrane 33, 133. Inflated, flexible membrane 33, 133 assumes a convex shape, having a convex upper surface 40, 140 for pressing the central portion of heated sheet 20. Control system 21 then extends conformable pressing assembly 16, 116 toward the carrier assembly 14, 114 and the rigid mold assembly 12, 112 at a second rate of speed so that the apex 49, 149 (FIGS. 4 and 10) of the convex surface of membrane 33, 133 presses the central portion of the heated sheet of glass 20 against the rigid mold 19, 119. Alternatively, depending on the radii of membrane 133 and female mold 119, the convex upper surface of membrane 133 may first contact the peripheral edges of the heated sheet as described above. The rolling action of the membrane against the female mold 119 may be multi-directional, depending on the specific mold shape. Similarly, for molds having complex curvatures on their surfaces, the rolling action may be multi-directional as the membrane and mold are moved toward one another. As the membrane 33, 133 is pushed toward rigid mold 19, 119, rigid mold 19, 119 exerts a counter pressure on membrane 33, 133 which causes the membrane 33, 133 to deform and to increase the pressure in the fluid 38. Control system 21 is programmed to maintain the pressure in fluid 38 at a controlled ramp pressure and, therefore, releases pressure in air bag 42, 142 through valve 48 as the pressure from rigid mold 19, 119 on the membrane increases above the desired ramp pressure. Control system 21 moves conformable pressing assembly 16, 116 until membrane 33, 133 completely covers the entire surface area of the sheet 20 and, at which point, membrane 33, 133 fully conforms heated sheet 20 to the shape of rigid mold 19, 119. Once the press is closed, the pressure in fluid 38 is preferably maintained at relatively constant pressure, usually 10 p.s.i. or less, to ensure consistent thermal contact between all the pressing elements during the cooling phase. Consequently, valve 48 is preferably a proportional valve which relieves the pressure in air bag 42, 142 when the pressure in bag 42, 142 reaches a selected maximum pressure. Valve 48 deflates air bag 42, 142 when the pressure in fluid 38 exceeds the maximum pressure and allows air to flow into air bag 42, 142 when the pressure in fluid 38 decreases below a minimum pressure. After the press cycle is complete, control system 21 actuates valve 80 to permit the flow of air from plant air supply P to be delivered to aperture 19a, 119a so that the bent sheet of glass 20 is released from rigid mold 19, 119.

While the description of the first preferred embodiment is described in reference to conformable pressing assembly 16, 116 being extendably supported on frame F and being moved from a holding position to a pressing position by a cylinder 30, it should be understood that more than one cylinder can be provided. Furthermore, rigid mold assembly 12, 112 can be similarly extendably supported on support structure S and can include at least one cylinder to move the rigid mold assembly 12, 112 from a holding position to a pressing position while conformable pressing assembly 16, 116 is stationary. Moreover, the rigid mold assembly 12, 112 and conformable pressing assembly 16, 116 may be supported and positioned to reciprocate along any plane, including a horizontal plane, or a canted plane, such 45 degrees. Therefore, references to "upper" and "lower" are not intended to limit the scope of the invention to rigid assembly 12, 112 and conformable pressing assembly 16, 116 positioned and spaced along a vertical axis.

GLASS BENDING AND TEMPERING APPARATUS AND METHOD

Figure 14:
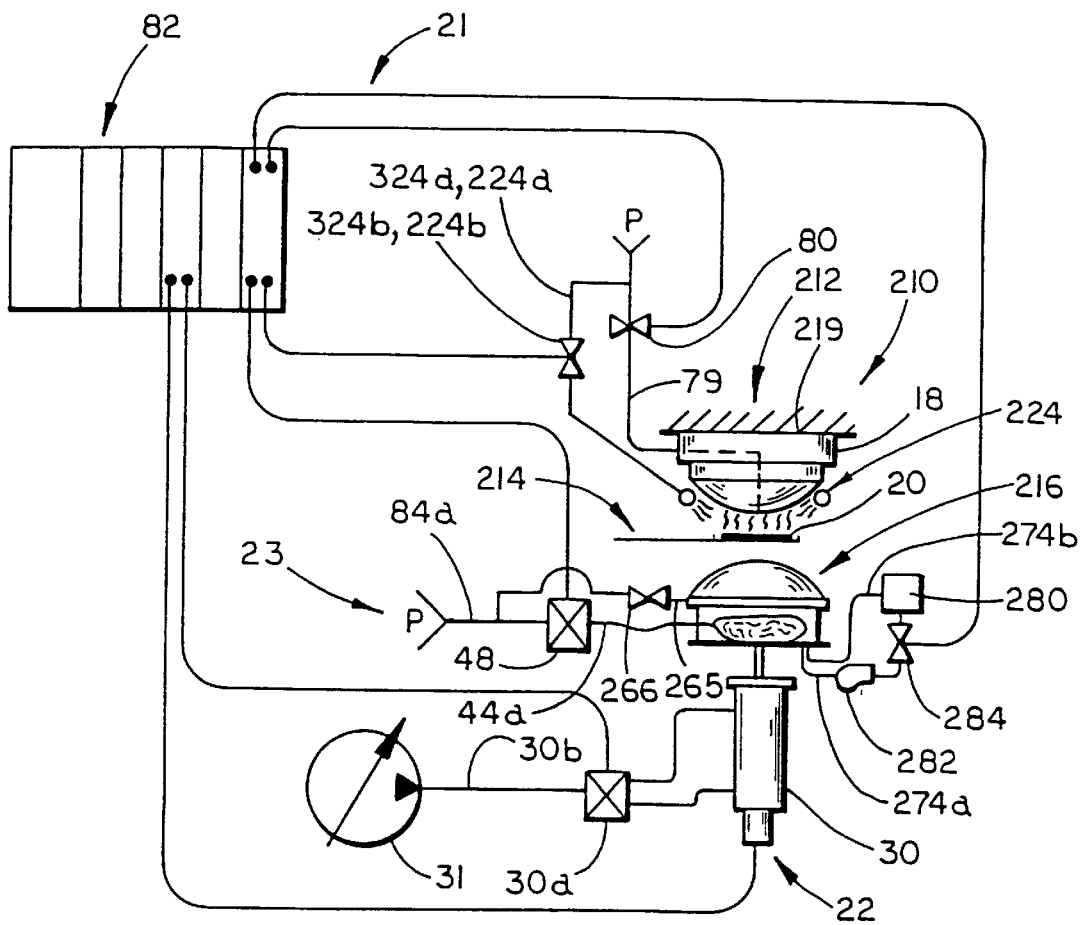
FIG. 14 is a schematic view of one embodiment of the glass bending and tempering apparatus and the control system of the present invention.
Figure 30:
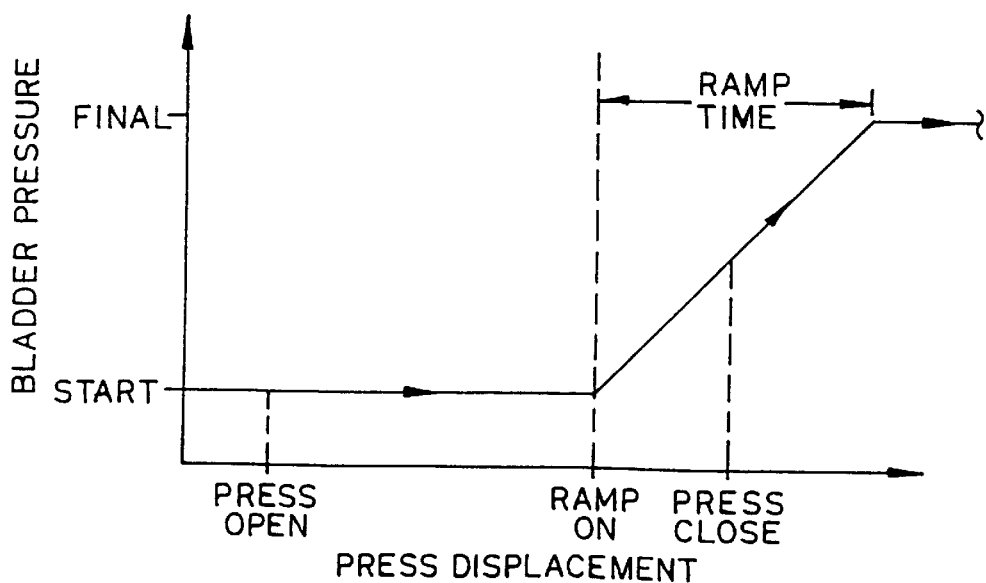
FIG. 30 is a graphical representation of the bladder pressure versus the displacement of the conformable membrane assembly.
Figure 15:
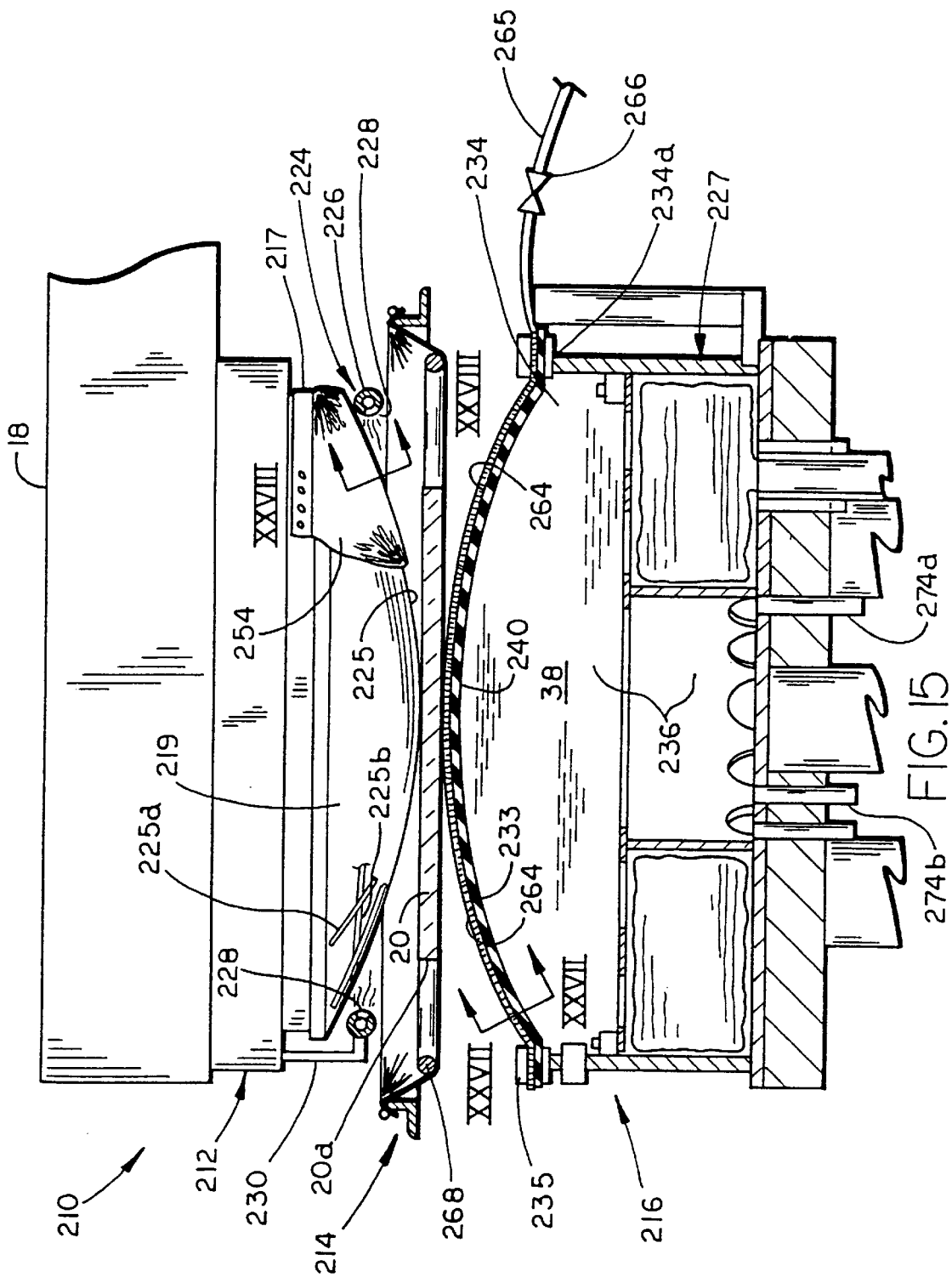
FIG. 15 is a front elevational view shown partially in section and similar to FIG. 4 of a glass bending and tempering apparatus, illustrating an air manifold positioned between the conformable membrane assembly and the rigid mold assembly for cooling the glass sheet positioned between the two assemblies.

In a third embodiment of the present invention, a bending and tempering apparatus 210 is shown in FIGS. 14 and 15, which includes a rigid mold assembly 212, a carrier or holder assembly 214, and a conformable pressing assembly 216. Bending and tempering apparatus 210 provides a method of rapidly cooling the edges of a heated sheet of glass, which do not contact either the rigid mold 219 of the mold assembly 212 or the flexible membrane 233 of pressing assembly 216, while bending and cooling the upper and lower surfaces of sheet 20. Preferably, bending and tempering apparatus 210 cools the edges of sheet 20 at the same rate as or at a faster rate of cooling than the central portion of sheet 20. In this manner, the edges and upper and lower surfaces of sheet 20 are cooled to place the edges and upper and lower surfaces of sheet 20 in compression to achieve tempering of sheet 20. Apparatus 210 is suitable for a wide range of glass thickness and permits bending and tempering of very thin sheets of glass on the order of 3 mm and less.

Rigid mold assembly 212 includes press frame 18, which is supported on a rigid support structure (not shown), and rigid mold 219 supported from press frame 18 onto which heated sheet 20 is pressed and rolled by conformable pressing assembly 216. Bending and tempering apparatus 210 provides bending and contact tempering of heated sheet 20 with the edge tempering of sheet 20 achieved either by air blasting or contact cooling. The term "air blasting" is used in its broadest sense—air blasting can be achieved by directing air or gas to heated sheet 20. Furthermore, the term "gas" is used in a broad sense. Gas includes, for example, air, nitrogen, and carbon dioxide, and the like. Moreover, gas includes gas containing liquids, for example gaseous liquids, such as moisture laden air, steam, air "fogs", and anatomized liquids, and the like, which are especially suitable for cooling thin sheets of glass. In addition, such air may be cooled or chilled. Preferably, both the rigid mold assembly 212 and conformable pressing assembly 216 are adapted to cool and, therefore, contact temper the upper and lower surfaces of heated sheet 20, while sheet 20 is rolled and pressed against rigid mold 219, as will be more fully explained. In the illustrated embodiments, air blast edge tempering is achieved either by an air manifold or by a foraminous cover that directs air to sheet 20 and its edges 20a. Contact edge tempering is achieved by one or both of the rigid mold assembly 212 and the conformable pressing assembly 216 being adapted to have a high thermal conductivity and heat capacity that is suitable for contact tempering the edge of sheet 20.

Tempering or toughening can be quantified in several ways: 1) by the stress in the glass; 2) by the fragmentation pattern of a shattered piece of glass; or 3) by the strength of the glass. Bending and tempering apparatus 210 may provide differing degrees of tempering. Preferably, bending and tempering apparatus 210 provides tempering or heat strengthening wherein the surface compression of the tempered sheet of glass is in the range of about 3,500 psi to 10,000 psi, or even greater. Preferably, the surface compression of the edge of the tempered sheet of glass is at least 5,500 psi. More preferably, the tempered sheet has a surface compression of at least 10,000 psi, with an edge compression of at least 9,700 psi, to meet ASTM C 1048 9.1.1.1 and 9.1.1.2 standards.

Figure 16:
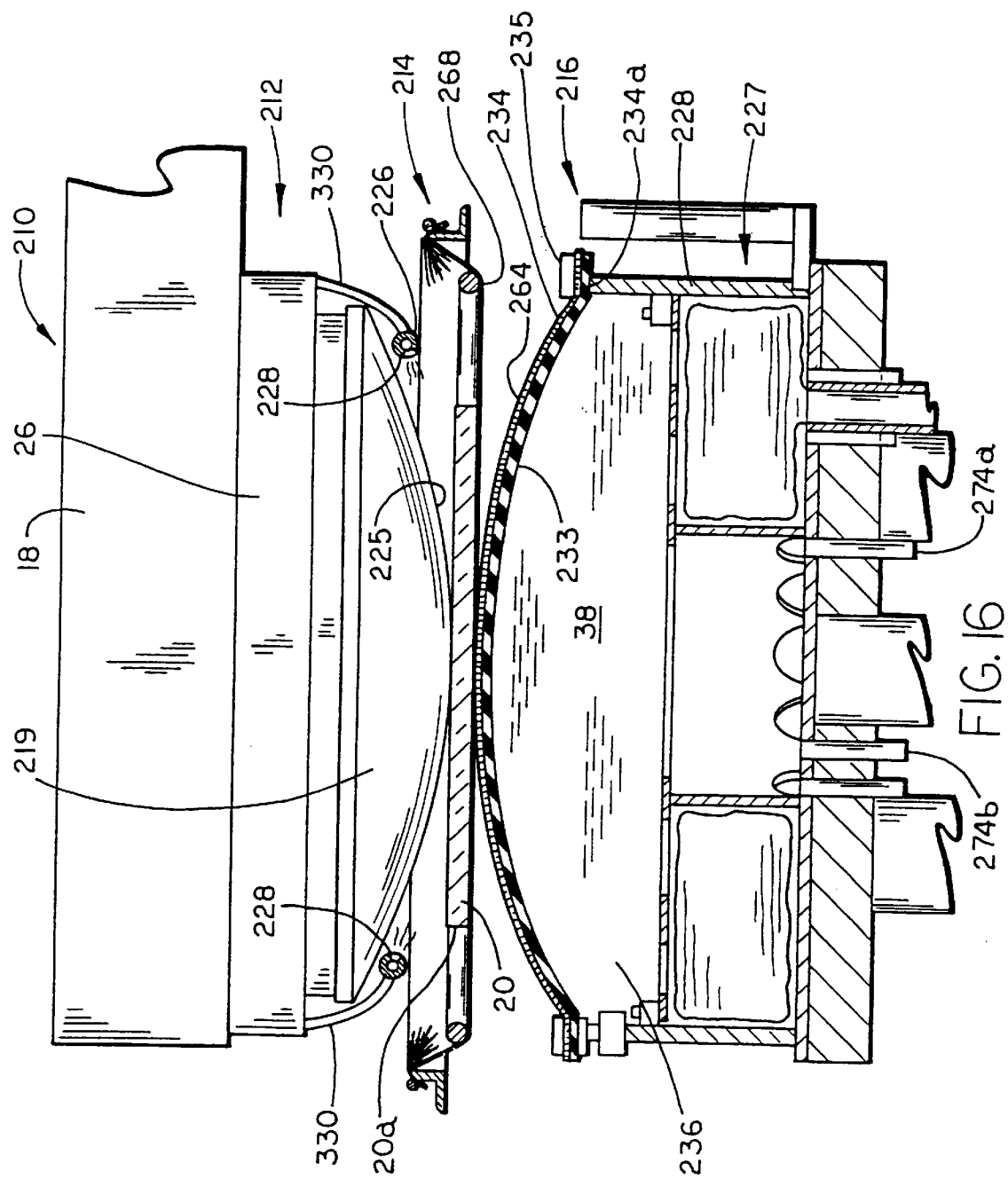
FIG. 16 is a front elevational view shown partially in section and similar to FIG. 4 of the glass bending and tempering apparatus illustrating a second embodiment of the air manifold.
Figure 17:
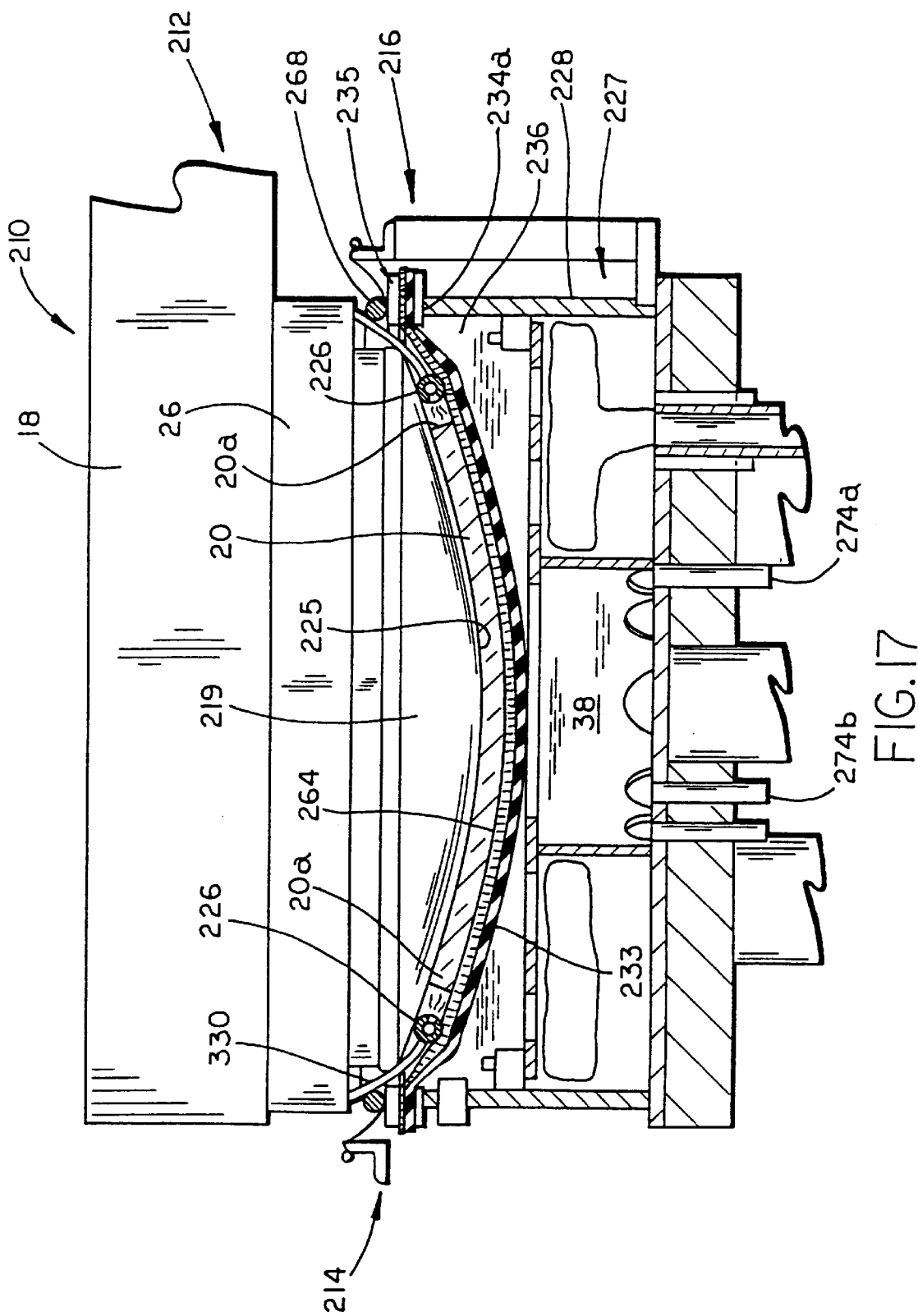
FIG. 17 is a front elevational view similar to FIG. 16 of the glass bending and tempering apparatus illustrating the conformable membrane pressing and rolling the glass sheet against the rigid mold assembly and conforming to the air manifold.

As best seen in FIGS. 15–17, rigid mold assembly 212, carrier assembly 214, and conformable pressing assembly 216 are of similar construction to rigid mold assembly 12, carrier assembly 14, and conformable pressing assembly 16, respectively, with the exceptions that will be noted below. Therefore, reference is made to rigid mold assembly 12, carrier assembly 14, and conformable pressing assembly 16 for the general details of their components and operation. The control of bending and tempering apparatus 210 is also similar to the control of bladder-molding apparatuses 10 and 110 with the exceptions noted below. Therefore, reference is made to bladder-molding apparatus 10 for the details of control system 21 and other associated hardware.

Referring to FIG. 15, edge tempering of sheet 20 may be achieved by an internal air manifold 224 which directs air to edge 20a of heated sheet 20 while sheet 20 is pressed and rolled against rigid mold 219 by conformable pressing assembly 216. Air is delivered to manifold 224 from plant air supply P through tubing 224a, which is regulated by valve 224b and control system 21 and pressurized preferably between 5 psi and 200 psi. However, in some applications the plant air supply P may be pressurized as high as 3,000 psi or more. In a first preferred form, manifold 224 comprises an annular conduit 226 having a plurality of spaced openings or apertures 228 through which air is passed and directed to sheet 20. It should be understood that conduit 226 may be one of a plurality of shapes and depends on the shape of sheet 20 as conduit 226 preferably extends around the perimeter of sheet 20. Manifold 224 is mounted on rigid mold assembly 212 by a plurality of relatively rigid supports 230 (only one of which is shown), which are welded or otherwise fixedly secured to cooling plate 26. It should be understood that supports 230 may also be welded or secured to the press frame. Supports 230 position conduit 226 between rigid mold 219 and conformable pressing assembly 216 to direct air from openings 228 to peripheral edges 20*a* or a peripheral portion of sheet 20 during bending.

In this manner, the edges 20*a* of sheet 20 are cooled so that edges 20*a* are placed in compression to achieve edge toughening of sheet 20 while sheet 20 is bent and the upper and lower surfaces of sheet 20 are contact tempered by rigid mold assembly 212 and conformable pressing assembly 216. Preferably, conformable pressing assembly 216, rigid mold assembly 212, and air manifold 224 cool edges 20*a* and the upper and lower surfaces of sheet 20 at a generally uniform rate. However, it can be appreciated that in some applications, for instance in windshields, it is desirable to cool the edge of the glass sheet at a faster rate than the central portion of the sheet to provide an enhanced edge temper on the glass sheet whereby the central glass area will break into large pieces when the sheet is subjected to excessive forces.

Figure 29A:
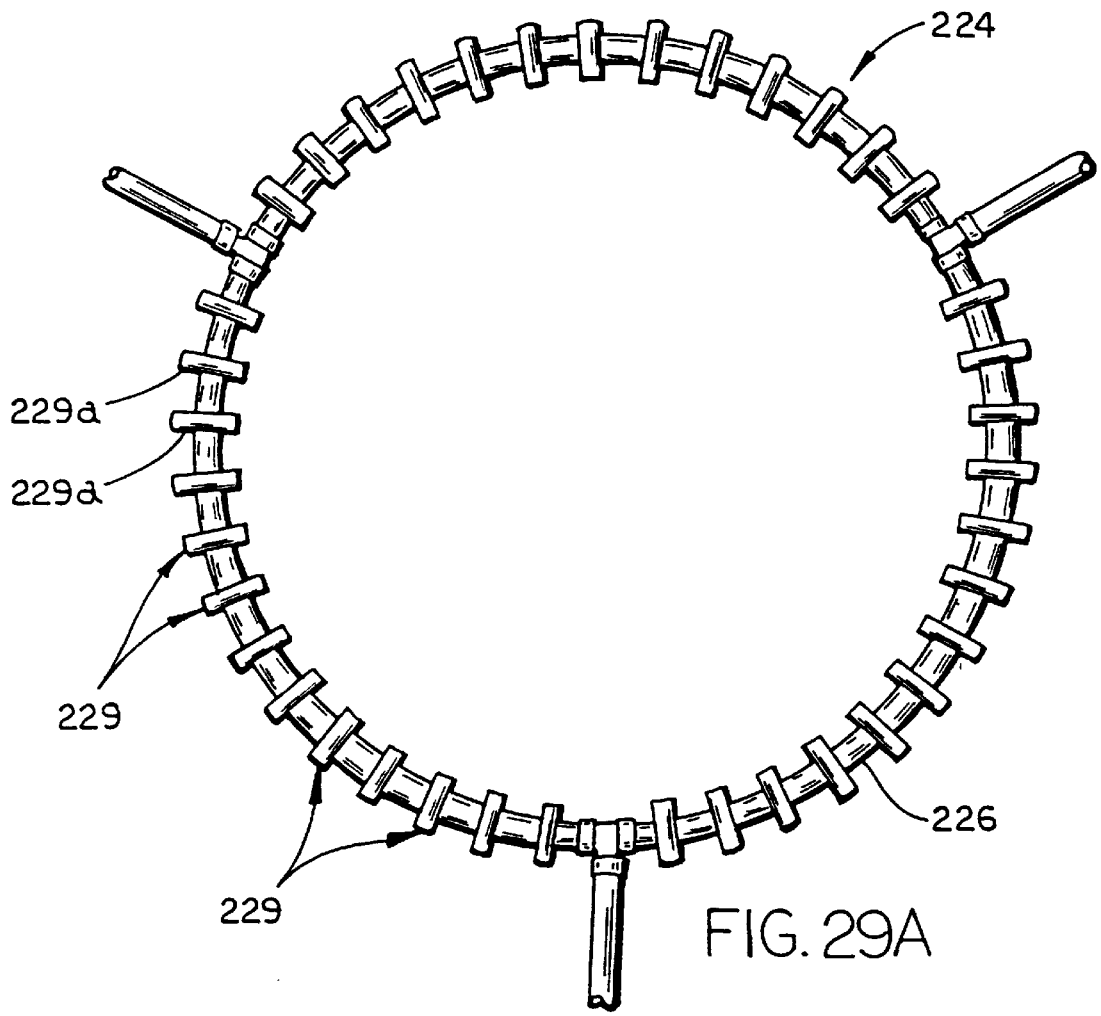
FIG. 29A is a plan view of the air manifold of FIG. 18 illustrating a plurality of air manifold vents.
Figure 29B:
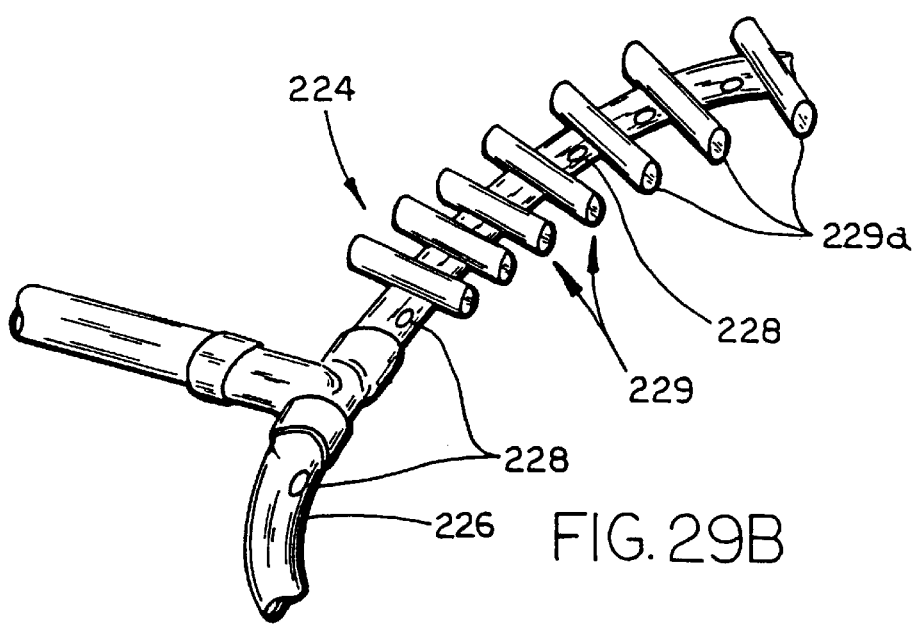
FIG. 29B is an enlarged partial perspective view of the air manifold of FIG. 29A.

As best seen in FIGS. 15–17, supports 230 and conduit 226 are positioned inwardly of weighted ring 268 of carrier assembly 214 and of gripping clamp 235 of conformable pressing assembly 216 to avoid an interference. Consequently, when flexible, conformable membrane 233 of pressing assembly 216 extends and presses against sheet 20, membrane 233 will roll around manifold 224 thereby conforming to the shape of conduit 226 to permit air tempering of the edges of sheet 20 during the bending and sheet contact tempering process. Similar to membranes 33 and 133, membrane 233 comprises a non-porous flexible material, which will conform to the rigid mold 219 and is capable of withstanding high pressures and temperatures. The membrane also may comprise a composite material. In some cases, the membrane may be slightly porous for tempering, for example a perspiring or oozing bladder. One example of a suitable composite is a thin copper woven cloth with an underlayment of KEVLAR™ film and an underlayment of stainless steel cloth.

Where membrane 233 completely encloses manifold 224, conduit 226 preferably includes a plurality of exhaust vents 229 (FIGS. 29A and 29B). Vents 229, in the illustrated embodiment, comprise tubular members 229*a* which are preferably welded or otherwise fixedly secured to conduit 226 at spaced intervals around the manifold. As best seen in FIG. 29A and 29B, vents are generally orthogonal to conduit 226 and project outwardly from membrane 233 so that the air which is directed to the edge of sheet 20 can escape through the passage provided by tubular members 229*a*. It should be understood that vents 229 may comprise channel shaped members or any other member having a passageway formed therein or therethrough. Furthermore, vents 229 may be formed by a plurality of spaced solid members, whereby the air is exhausted from the spaces formed between the adjacent members. Vents 229 may also be provided by a plurality of air relief passages 225*a* formed in molding surface 225 (FIGS. 15 and 19). Air relief passages 225*a* preferably comprise a plurality of radially spaced grooves that extend from inside manifold 224 to the outer perimeter of rigid mold 219. These grooves on the molding surface provide passages so that the air used to cool the heated sheet 20 can be exhausted from between the rigid mold 219 and membrane 233. It should be understood that there are numerous ways of forming or providing exhaust passages or exhaust vents.

As in the case of bending apparatus 10, the glass sheet (20) is first heated to a temperature so that sheet 20 is in a formable state, for example preferably between about 1000° F. and 1250° F., before the sheet is positioned in the bending and tempering apparatus 210. The air directed to the sheet by manifold 224 is preferably in a temperature range between about 70° F. to 110° F. More preferably, the air is in a temperature range of about 70° F. to about 90° F. Furthermore, the tempering cycle, that is the time period over which air is directed to the sheet and the sheet is contacted by either the rigid mold assembly or the conformable pressing assembly, is preferably in a range of about 5 seconds to 20 seconds. More preferably, the tempering cycle is in a range of about 7 to 15 seconds. When cooling a glass sheet, the outer skin or surfaces of the sheet cool faster than the inner layer or core of the sheet. As a result the outer surfaces are placed in compression while the inner layer or core of the sheet is placed in tension, which tempers the glass sheet. To temper the edge of the sheet, the edge of the sheet is cooled at a faster rate than the central portions of the sheet inducing a compressive force at the edge of the glass sheet, which prevents spontaneous breakage and reduces the sensitivity of the edge of the sheet to breakage.

In another embodiment shown in FIGS. 16–18, conduit 226 is supported by a flexible support 330, such as a cable. As best seen in FIGS. 17 and 18, when the flexible, conformable membrane 233 of pressing assembly 216 is extended and presses against sheet 20, membrane 233 will press against manifold 224. Since supports 330 are relatively flexible, conduit 226 will be permitted to move closer to molding surface 225 as membrane 233 conforms to the shape of conduit 226.

In yet another embodiment, shown in FIG. 19, edge tempering of sheet 20 is achieved by an external air manifold 324. External manifold 324 includes an annular tubular member 326 having a plurality of openings 328. Annular member 326 has a square, rectangular or other tubular cross-section and is welded or otherwise secured to cooling plate 26. In this manner, annular tubular member 326 extends around the outer perimeter of rigid mold 219 and is outside of the path of conformable pressing assembly 216. In the illustrated embodiment, external manifold 324 is secured to cooling plate 26, but it should be understood that external manifold 324 can also be welded or otherwise secured to the press frame. Air is directed to tubular member 326 through tubing 324*a*, which is regulated by a valve 324*b* and control system 21. Air is directed from openings 328 of conduit 326 to edges 20*a* of sheet 20 by a baffle plate 332, which extends downwardly and inwardly such that its terminal portion extends generally parallel to the molding surface 225 of rigid mold 219 in order to deflect the air coming out of openings 328 inwardly between rigid mold 219 and conformable pressing assembly 216 as conformable pressing assembly 216 presses and rolls sheet 20 onto rigid mold 219.

Baffle plate 332 preferably extends between rigid mold 219 and conformable membrane 233 so that when pressing assembly 216 moves toward rigid mold 219, conformable membrane 233 rolls against sheet 20 and over the distal portions of baffle plate 332. Where the baffle plate 332 is covered by membrane 233, baffle plate 332 preferably includes a plurality of apertures 332*a* to permit the air to exhaust from between rigid mold 219 and conformable pressing assembly 216. Alternatively or in addition, rigid molding surface 225 may include air relief passages 225*a* to exhaust the air from between rigid mold 219 and conformable pressing assembly 216. In this application, air relief passages 225a are interconnected by at least one circumferential or annular air passage 225b (FIG. 15). At least one air relief passage 225a or annular air passage 225b is positioned and aligned with opening 219a so that air relief passages 225a and annular air passage 225b are in fluid communication with passageway 219b of rigid mold 219. In this manner, passageway 219b is used to exhaust the air from between the rigid mold and the membrane 233 to the atmosphere through valve 80.

In yet another arrangement, air relief passages 225a and annular air passage 225b form an air manifold on the molding surface of rigid mold 219 to direct air to sheet 20 and edges 20a of sheet 20 to thereby temper sheet 20. The flow of air from air relief passages 225a and annular air passage 225b may be controlled by valve 80. The number of air passages 225a and 225b, the number of passageways 219b, and the size of the grooves forming the air passages may be increased or decreased to adjust the flow of air to sheet 20. It should be understood from the foregoing that air edge tempering of sheet 20 can be achieved using the present invention by any one of or a combination of the features described above.

Referring to FIGS. 22–24 and 28, contact tempering may be achieved by a cover 254 on rigid mold 219, which is secured to mold 219 by a strap or clamp 217 that extends around the perimeter of rigid mold 219. Cover 254 preferably comprises a thin, highly conductive material, and/or a material having a high heat capacity such as a flexible, stainless steel cloth. More preferably, cover 254 comprises a fiberglass cloth, style 7628, approximately 0.010 inches thick from Burlington Glass Fabrics Co., Rockliegh, N.J. By covering rigid mold 219 or rigid mold assembly with a highly thermal conductive cover and/or a cover with a high heat capacity, bending and tempering apparatus 210 achieves significant stress in the bent glass to affect contact tempering or heat strengthening of sheet 20 while sheet 20 is rolled against rigid mold assembly 212 by conformable pressing assembly 216.

Figure 23:
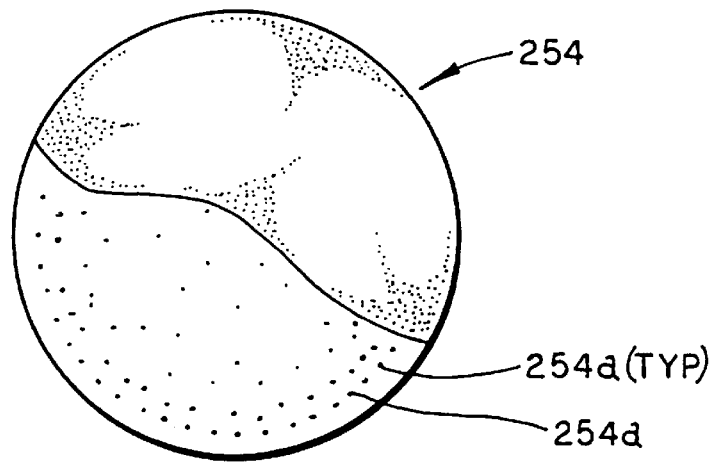
FIG. 23 is a plan view of the cover with portions broken away and extending over the rigid mold shown in FIG. 22.

Cover 254 may also include a plurality of inserts 254a of a highly thermally conductive material, such as silver, copper, aluminum, molybdenum, uranium, titanium, steel, metal alloys, diamond, composites, boron nitrate, or the like, with a coefficient of thermal conductivity in the range of about 10 to 500 BTU/(hr.ft.° F.) and a heat capacity in a range of about 0.1 to 100 BTU/ft$^{3-°}$ F. More preferably, inserts 254a each have a thermal coefficient of conductivity in a range of about 30 to 300 BTU/(hr.ft.° F.). Most preferably, inserts 254a each have a coefficient of thermal conductivity in a range of about 46 to 247 BTU/(hr.ft.° F.) and a heat capacity in the range of about 30 to 70 BTU/ft$^{3-°}$ F. Inserts 254a are preferably impregnated into or molded in cover 254 to increase the heat transfer from sheet 20 to the rigid mold 219 to further affect the contact tempering of sheet 20. Inserts 254a include, for example, deposits of powder, fibers, or the like of the highly thermally conductive material mentioned above suspended in a matrix substrate, such as silicone rubber, or solid strips or pieces of the highly conductive material. These are just a few examples of several forms inserts 254a may take and are not intended to limit the scope of the type of insert that can be used. As best seen in FIG. 23, the density of inserts 254a may be increased around the perimeter of cover 254 and aligned with the peripheral region of sheet 20 to increase the rate of heat transfer from edges 20a of the sheet 20 to the rigid mold 219 to affect contact edge tempering of sheet 20.

Figure 22:
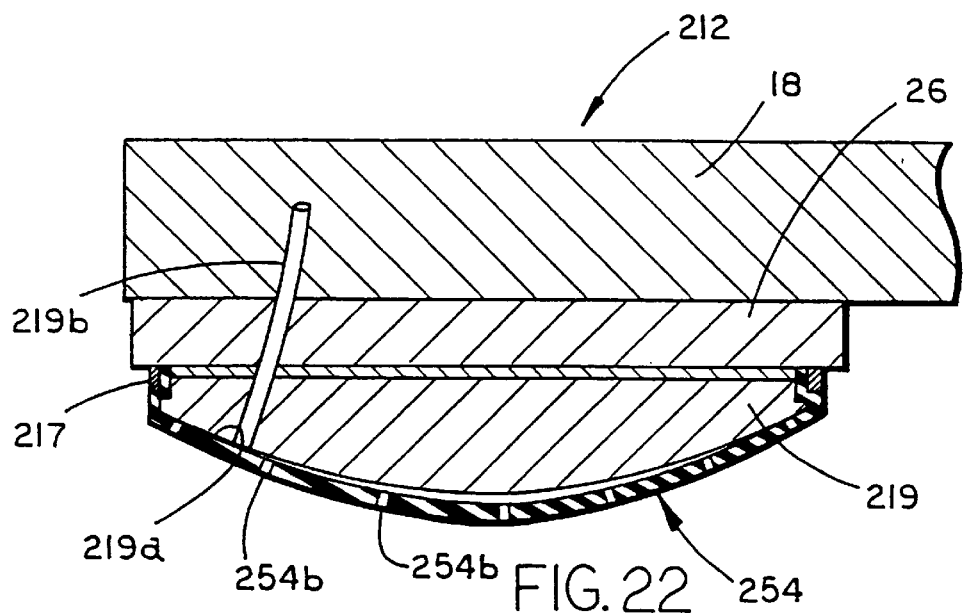
FIG. 22 is a cross-sectional view similar to FIG. 19 illustrating a cover extending over the rigid mold assembly.
Figure 24:
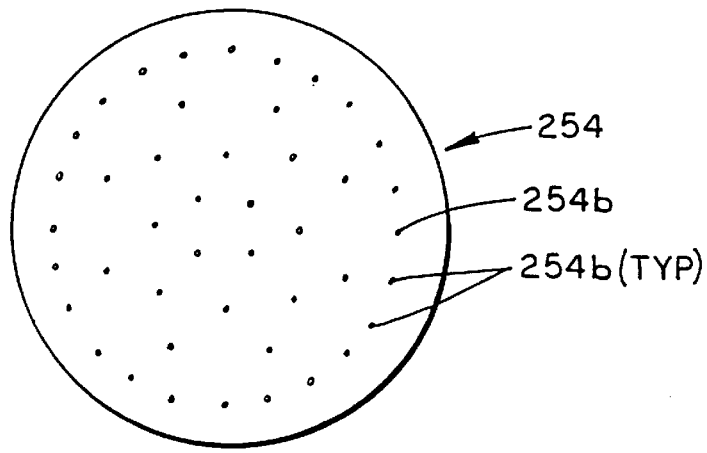
FIG. 24 is a plan view of another rigid mold cover.

In addition or alternatively, as shown in FIG. 24, cover 254 may include a plurality of openings 254b for directing air to heated sheet 20. As best seen in FIG. 22, foraminous cover 254 is inflated by air delivered through aperture 219a and passageway 219b in rigid mold 219 from plant air supply P. However, it should be understood that the air may be supplied from other sources or processed, for example, through a humidifier to inject moisture into the air. As cover 254 is inflated, openings 254b in cover 254 direct air to sheet 20. Again, the distribution or concentration of openings 254b may be greater around the perimeter of cover 254 to direct more cooling air to edges 20a of sheet 20 (FIG. 24) and thereby edge temper sheet 20 by air blasting. To exhaust the air used in this tempering process, conformable pressing assembly 216 may be stopped just before sheet 20 is completely enclosed by membrane 233. Alternatively, conformable pressing assembly 216 may be pressed against sheet 20 until sheet 20 is completely covered and enclosed by membrane 233 and then lowered slightly to permit air to exhaust between rigid mold 219 and membrane 233. Again, as described previously, relief passages may be formed on rigid mold 219.

Rigid mold 219 is of similar construction to rigid mold 19, preferably comprising a solid aluminum mold having a smooth, outer molding surface 225 onto which the heated rigid sheet 20 is pressed and rolled by conformable pressing assembly 216. Like mold 19, rigid mold 219 may comprise a male mold having a convex molding surface, a female mold having a concave molding surface, or a compound or complex molding surface. Furthermore, rigid mold 219 may include an outer layer of a highly thermally conductive material, such as silver, copper, aluminum, molybdenum, uranium, titanium, steel, metal alloy, diamond, composites, boron nitrate, or the like, to increase the heat transfer from heated sheet 20 to the rigid mold 219 and thereby affect contact tempering of sheet 20. Moreover, rigid mold 219 may comprise a solid silver or copper mold. But since this would likely prohibitively increase the cost of the mold, cladding may be the more desirable alternative. Similar to cover 254, rigid mold 219 may be adapted to have a greater thermal conductivity and/or heat capacity at the rigid mold's peripheral portion, where the perimeter of sheet 20 will contact during bending to affect edge tempering. By increasing the thermal conductivity and heat capacity of the rigid mold at its perimeter, edges 20a of sheet 20 may be cooled at the same rate or at faster rate than the central portions of the sheet to thereby temper sheet 20. A key to achieving a well tempered or heat strengthened sheet of glass is to effectively cool the edge to thereby induce a compressive force or stress on the glass edge. As described previously, a compressive edge stress is desirable to prevent spontaneous breakage and reduce the sensitivity of the edge to impact breakage.

Referring to FIG. 20, in which another embodiment of the rigid mold is shown, rigid mold 319 may include an insert 319c that aligns with the perimeter of sheet 20 to increase the heat transfer from edges 20a of sheet 20 to rigid mold 219. Insert 319c is preferably an annular insert to the extent that the insert encompasses the perimeter of the glass sheet in the molding apparatus. Insert 319c extends around the perimeter of rigid mold's molding surface and is positioned in a corresponding groove 319d provided in rigid mold 219 and may be affixed in groove 319d by an adhesive, such as Dow Coring 732. It should be understood that insert 319c may comprise a single piece of material or a plurality of discrete pieces of material that are aligned in an abutting relationship to form a substantially continuous insert. Furthermore, insert 319c may comprise a discontinuous insert having a plurality of discrete inserts that are aligned in a plurality of discrete grooves that are formed around the perimeter of rigid mold 219 and positioned to align along the perimeter of sheet 20. As best seen in FIG. 20, insert 319c preferably projects from molding surface 325 of rigid mold 319 by a distance within the range of between about 0 and 0.07 inches. In this manner when sheet 20 is rolled and pressed against rigid mold 219, insert 319c wraps around edges 20a and thereby contacts edges 20a of sheet 20 during the bending and tempering process to contact temper edges 20a.

Figure 21:
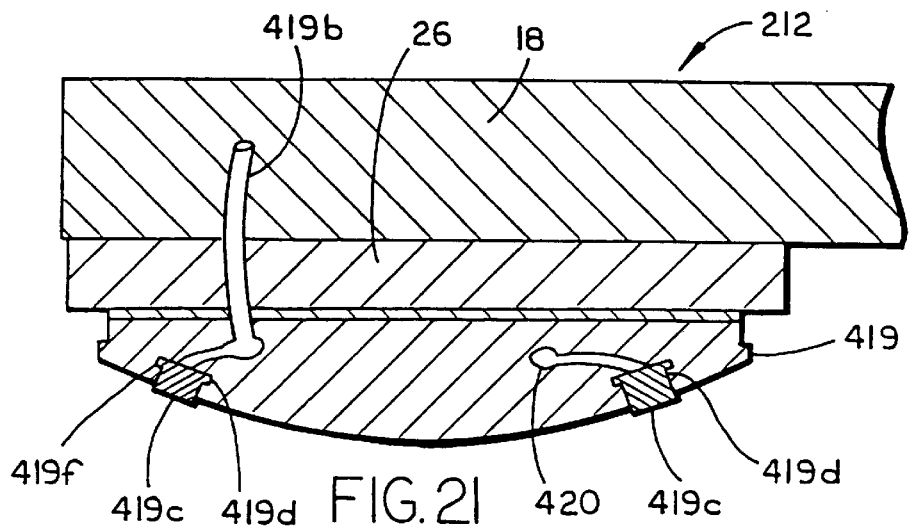
FIG. 21 is a cross-sectional view similar to FIG. 19 illustrating another embodiment of the rigid mold assembly with an insert.

In another preferred form of the rigid mold, which is shown in FIG. 21, rigid mold 419 includes an insert 419c with a T-shaped cross-section having a pair of flanges 419f. Flange 419f cooperate with a T-shaped groove 419d provided in rigid mold 419 to thereby mechanically hold insert 419c therein. In this manner, insert 419c can be inserted and mechanically retained in groove 419d without an adhesive.

To achieve contact tempering in these embodiments, inserts 319c, 419c preferably have a higher coefficient of thermal conductivity and heat capacity than the respective molding surfaces of rigid molds 319, 419 so that when membrane 233 presses and rolls sheet 20 onto rigid mold 319 or 419 and inserts 319c, 419c contact edges 20a of sheet 20 and thereby cool edges 20a. Where enhanced edge tempering is desired, inserts 319c, 419c may be adapted to cool edges 20a at a faster rate than the central portion of sheet 20.

Preferably inserts 319c, 419c comprise a silicone open cell sponge material, which is available from CHR Industries, Rolling Meadows, Ill. In this application, porous inserts 319c, 419c are laden with a fluid, such as water, which on contact with edges 20a of sheet 20 vaporizes thereby removing heat from edges 20a of sheet 20. Preferably, the fluid is delivered to the insert and to the sheet of glass below its vaporization temperature. The heat of vaporization can be varied to increase or decrease the rate of cooling by using solutions of fluids such as water and alcohol. Furthermore, the fluid containing insert material, for example the sponge, can be sealed with a thin membrane material such as KEVLAR™ so that it conforms to edges 20a of sheet 20, letting the fluid vaporize to remove the heat from edges 20a while the KEVLAR™ membrane remains cool.

As best seen in FIGS. 20 and 21, rigid molds 319, 419 each includes a passageway 319b, 419b, respectively, which may be adapted to deliver fluid to the respective inserts. Passageway 319b delivers fluid to insert 319c through a single gate. However, as shown in FIG. 21, fluid can be delivered to the insert through an annular manifold 420, which is formed internally within rigid mold 419. In the illustrated embodiment, annular manifold 420 preferably includes one or more gates. In this way, when inserts 319c, 419c contact heated sheet 20 and the fluid in the inserts absorbs heat from sheet 20 and, consequently, evaporates, inserts 319c, 419c will be continuously replenished with fluid through the respective passageway 319b or 419b. In further describing the rigid mold of apparatus 210, it should be understood that the details and descriptions made in reference to rigid mold 219 may equally apply to rigid molds 319 and 419.

Similar to conformable pressing assembly 16, conformable pressing assembly 216 includes flexible membrane 233, which is adapted to press sheet 20 against rigid mold 219. As best shown in FIGS. 15–17, flexible, conformable membrane 233 extends over and is secured to the perimeter 234a of an open end 234 of the frame 227 by annular gripping element or clamp 235, which is preferably welded to the entire perimeter of cylindrical wall 228. Membrane 233 may comprise a silicone rubber material similar to membrane 33 and operates like a diaphragm, flexing in and out of open end 234 of frame 227 in response to the pressure applied from fluid 38 in chamber 236. In its extended position, membrane 233 assumes a convex upper surface 240 for rolling the sheet 20 onto the rigid mold 219. Alternatively, membrane 233 may assume a concave upper surface for rolling against sheet 20. The concave upper surface of membrane 233 is particularly applicable when bending and/or tempering a pre-bent heated sheet of glass. As will be described, pre-bending sheets may be preferred in some applications, such as in the case of thin glass sheets. More preferably, membrane 233 comprises a stainless steel cloth available under the name Bekitherman FAS800-3166N. V. from Bekaert S. A. Zwevegen, Belgium, with a underlayment of Teflon coated glass fabric, which is available under the part number 100-6TA or 100-60R Block obtained from Greenbelt Industries Inc., Buffalo, N.Y. Reference is made to membrane 33 for further details of operation and other preferred compositions, properties, and thicknesses. Furthermore, like membrane 33, flexible membrane 233 is cooled by fluid 38.

In this preferred embodiment, fluid 38 is cooled by an external heat exchanger 280 (FIG. 14) and the cooling coils used in other embodiments of the pressing assembly (16, 116) described above may be omitted. Fluid 38 is pumped from chamber 236 through outlet tubing 274a to heat exchanger 280 by a pump 282, which is regulated by valve 284 and control system 21. Fluid 38 is then returned to chamber 236 through a return tubing 274b from heat exchanger 280. Circulation of fluid 38 through heat exchanger 280 increases the cooling rate of membrane 233 and, in turn, of sheet 20. Preferably, the flow rate or the system design must be capable to maintain the incompressible fluid below 100° F. The cooling capacity varies with the size and design of the bending apparatus. Alternatively, an internal heat exchanger, such as the cooling coils 74 described in reference to bending apparatuses 10 and 110, may be positioned in chamber 236 to cool fluid 38 and membrane 233.

Figure 25:
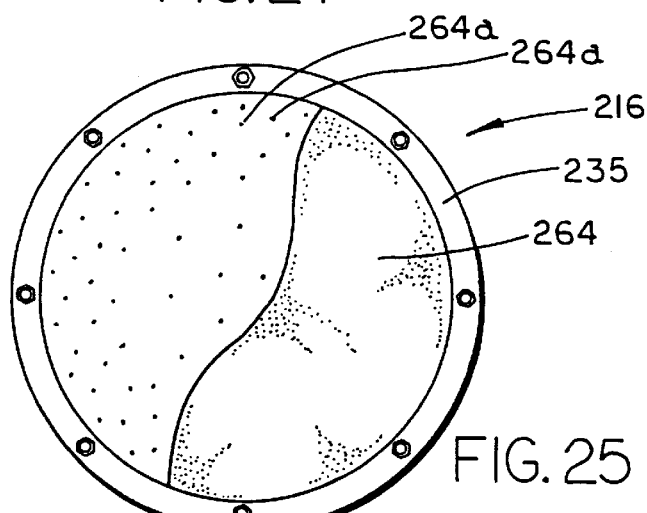
FIG. 25 is a plan view of a foraminous cover with portions broken away and extending over the conformable membrane.
Figure 27:
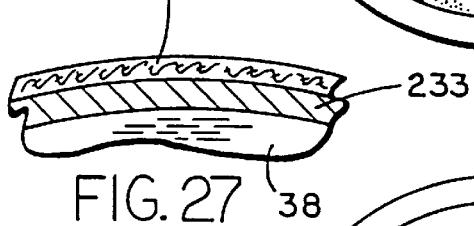
FIG. 27 is a cross-sectional view taken along line XXVII—XXVII of FIG. 15.
Figure 28:
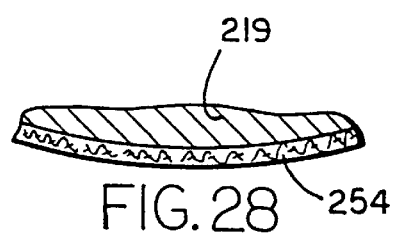
FIG. 28 is a cross-sectional view taken across line XXVIII—XXVIII of FIG. 15.

Similar to rigid mold 219, flexible, conformable membrane 233 preferably includes a cover 264 (FIGS. 15–18, 25 and 27) to increase the heat transfer from sheet 20 through membrane 233 to cooling and pressurizing fluid 38. Cover 264 is preferably of similar material or construction to cover 254 and comprises a fiberglass cloth, style 7628, from Burlington Glass Fabrics Co., Rockliegh, N.J., having a range of thickness of 0.002 to 0.5 inches. Most preferably, the fiberglass cloth is approximately 0.010 inches thick. Similar to cover 254, cover 264 may include a plurality of inserts 264a of highly thermally conductive material, such as silver, copper, aluminum, molybdenum, uranium, titanium, steel, metal alloy, diamond, composites, boron nitrate, or the like, with a coefficient of thermal conductivity in a range of about 10 to 500 BTU/(hr.ft.° F.) and heat capacity in a range of about 0.1 to 100 BTU/ft$^3$-° F. More preferably, each insert 264a has a thermal coefficient of conductivity in a range of about 30 to 300 BTU/(hr.ft.° F.). Most preferably, inserts 264a have a thermal coefficient of conductivity in a range of about 46 to 247 BTU/(hr.ft.° F.) and heat capacity in the range of about 30 to 70 BTU/ft$^3$-° F. Similar to inserts 254a, inserts 264a may be impregnated into or molded in cover 264 to increase the heat transfer from sheet 20 through the membrane 233 to fluid 238 (FIG. 25). As best seen in FIG. 25, the density of inserts 264a may be increased around the perimeter of cover 264, which aligns with the peripheral portion of sheet 20 to increase the rate of heat transfer from the perimeter edges 20*a* of the sheet 20 to membrane 233 and thereby cool and contact temper perimeter edges 20*a* of sheet 20. In this manner, heat is rapidly removed from edges 20*a* of sheet 20 through a highly conductive material and transferred to the fluid 38, which preferably comprises water and which provides a good heat transfer medium. Most preferably, the cover provides a thin layer of highly conductive material, which together with the water, will quickly withdraw heat from sheet 20.

Figure 26:
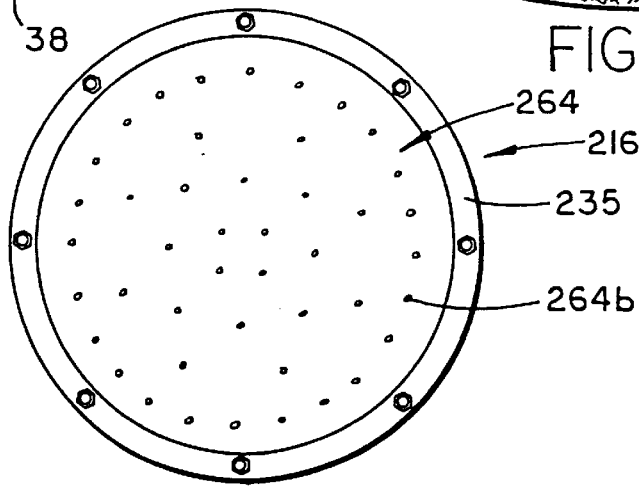
FIG. 26 is a plan view of another embodiment of the cover extending over the conformable membrane.

In addition or alternatively, cover 264 may include a plurality of pores or openings 264*b* (FIG. 26). Cover 264 is then preferably inflated by air delivered by a conduit 265 (FIGS. 14 and 15), such as tubing or flexible hose, from plant air supply P and regulated by a valve 266 and control system 21. As cover 264 is inflated, openings 264*b* direct air to sheet 20. Again, the distribution or concentration of openings 264*b* may be greater around the perimeter of cover 264 to direct more cooling air to peripheral portion 20*a* of sheet 20 than to the central portions of the sheet to affect air tempering of sheet 20. In some applications, where sufficient edge cooling of sheet 20 is achieved with covers 254 and 264, manifold 224 or 324 may be omitted. Where manifold 224 or 324 is omitted, flexible membrane 233 and cover 264 extend over the full width of sheet and wrap around edges 20*a* of sheet 20 so that as membrane 233 and cover 264 push and roll sheet 20 against rigid mold 219, sheet 20 is substantially enclosed by membrane 233 and cover 264. As described in reference to rigid mold 219, air passages may be formed on molding surface 225 to exhaust the air from between rigid mold 219 and membrane 233. Where rigid mold 219 includes air relief passages 225*a,* the air passes through cover 254 to be vented or exhausted by air relief passages 225*a*. Since cover 254 is generally porous in most of its forms, air freely passes back and forth through cover 254.

As described previously, the term air blasting of sheet 20 is used in its broadest sense. Air blasting can be achieved by directing air or a gas, such as nitrogen and carbon dioxide and gaseous liquids. For example, gaseous liquids, such as moisture laden air, air "fogs", low temperature steam, and anatomized liquids will cool the glass quicker than a low humidity gas or air. Therefore, since moisture laden air will tend to cool sheet 20 quicker, moisture laden air is preferred for air blasting when bending and tempering thinner sheets of glass.

In a further embodiment of the method of tempering and bending sheet 20, peripheral edges 20*a* of sheet 20 may be masked with a masking material, such as stainless steel, applied directly to edges 20*a* of sheet 20 during heating so that the temperature of the sheet's edges remains at a lower temperature than the central portions of sheet 20. In this manner, an edge cooling differential with respect to the central portion of the sheet is achieved from the outset.

Alternatively, sheet 20 may be bent before the contact tempering steps of the bending and tempering apparatus through pre-bending. As a result, the mechanical stress of bending is removed from the tempering process. Pre-bending can be achieved several ways. For example, in the last heating zone of the furnace, a mold having a molding surface is raised during the final heating phase so that the glass sags under the force of gravity into or onto the mold. This is known as slump bending. If the mold has a complementary shape to the rigid mold 19, 119, 219, 319 or 419, very little bending remains and, therefore, the mechanical stress associated therewith is almost eliminated during the final press and tempering phase. In another pre-bending process, a mold having a lower molding surface with vacuum holes is lowered into the furnace to pre-form the glass to the lower surface of the mold. In this manner, the glass is lifted up to the mold and conformed to the lower molding surface by a vacuum. Reference is made to U.S. Pat. No. 4,859,225 for an example of vacuum molding.

As described previously, rigid mold 219 is supported by press frame 18 on cooling plate 26. Cooling plate 26 preferably comprises a metal plate, such as aluminum, with a plurality of transverse passages (not shown) to accommodate the flow of cooling fluid through plate 26, which cools the rigid mold 219 by thermal conduction. It should be understood that the amount of cooling can be varied by increasing the number of passages, changing the temperature of the coolant, and/or by increasing the flow of cooling fluid through the passages to thereby increase the cooling of sheet 20. Furthermore, bending and tempering apparatus 210 as described above includes a plurality of components for cooling and tempering sheet 20. With the present invention, tempering can be achieved through contact tempering alone, such as with inserts 319*c* or 419*c* and/or covers 254 and 264. Furthermore, tempering or toughening can be achieved through the combination of air and contact tempering, such as the combination of air manifold 224 or 324 and flexible bladder 233 and or covers 254 and 264. It should be understood that various combinations of these components can be used to achieve the bending and tempering of sheet 20 without departing from the scope of this invention.

The present invention is useful in a variety of applications. For example, a variety of glass substrates can be bent and tempered/toughened such as is described herein. Such glass substrates may include specialized glass substrates such as the ultraviolet absorbing and/or tinted substrates described in U.S. Pat. No. 5,239,406 entitled, "Near-Infrared Reflecting, Ultraviolet Protected, Safety Protected Electrochromic Vehicular Glazing" to Niall R. Lynam, issued Aug. 24, 1993, the disclosure of which is hereby incorporated by reference herein. Also, coated glass substrates can be simultaneously bent/tempered or toughened. For example, diffuser coating anti-reflector coated substrates suitable for use as anti-glare screens on cathode ray tube (CRT) displays and the like can be used. Such coated substrates are described in U.S. patent application Ser. No. 08/708,803, filed Sep. 9, 1996, the disclosure of which is hereby incorporated by reference herein. Also, bendable/temperable functional coatings, such as the elemental semiconductor coated substrate (such as coated with a layer of silicon or silicon/silicon dioxide/silicon multi-layers to form reflective substrates) disclosed in U.S. Pat. No. 5,535,056, the disclosure of which is hereby incorporated by reference herein, can be used. Also, a bendable transparent conductor coated substrate, such as a glass substrate coated with a doped tin oxide coating (such as with antimony doping or fluorine doping) or a multi-layer comprising of a doped tin oxide with antiridescence properties can be utilized. Desirably, suitable tin oxide coated substrates can be obtained commercially as "TEC-Glass" products from Libbey-Owens-Ford Co., LOF Glass Division, Toledo, Ohio. The "TEC-Glass" products, commercially available from Libbey-Owens-Ford Co., are manufactured by an on-line chemical vapor deposition process. This process pyrolitically deposits onto clear float glass a multi-layer thin film structure, which includes a microscopically thin coating of fluorine-doped tin oxide (having a fine grain uniform structure) with additional undercoating thin film layers disposed between the fluorine-doped tin oxide layer and the underlying glass substrate. This structure inhibits reflected color and increases light transmittance.

The resulting "TEC-Glass" product is a non-iridescent glass structure having a haze within the range of from about 0.1% to about 5%; a sheet resistance within the range of from about 10 to about 1,000 ohms per square or greater; a daylight transmission within the range of from about 77% to about 87%; a solar transmission within the range of about 64% to about 80%; and an infrared reflectance at a wavelength of about 10 $\mu$m within the range of from about 30% to about 87%.

Products that can be manufactured utilizing the disclosure of the present invention include electrochromic mirrors, windows and displays such as are described in U.S. patent application (Serial No.: Not yet assigned) entitled "Electrochromic Polymer Solid Films, Manufacturing Electrochromic Devices Using Such Films, and Processes For Making Such Solid Films and Devices", invented by Varaprasad et al, filed Mar. 27, 1997 (Attorney docket No: 6903 CIP C1 CIP), the disclosure of which is hereby incorporated by reference herein. For example, it is useful to temper/toughen the front substrate (and optionally the rear substrate) used in bent, laminate electrochromic mirrors, windows and devices where a front bent substrate and a bent rear substrate sandwiches an electrochromic medium, such as is described in the Varaprasad et al. application referenced above. Also, bending/tempering simultaneously such as is described herein is useful for economically fabricating bent, tempered windows such as for automotive glazing. Such bending/tempering can be utilized, for example, for forming quarter windows and the like for use in automobiles and where, after bending/tempering, an integral molding of a gasket and the like will occur such as is described in U.S. Pat. Nos. 4,072,340; 4,139,234; and 5,544,458, the disclosures of which are hereby incorporated by reference herein.

While several forms of the invention have been shown and described, other forms will now be apparent to those skilled in the art. For example, various other materials may be used for membranes 33, 133, and 233 provided they have sufficient flexibility and strength to conform sheet 20 to the respective rigid mold. Furthermore, membranes 33, 133, and 233 must be able to with stand the high temperatures associated with bending and temperature. Furthermore, various cooling and pressurizing fluids may be used to inflate and cool membranes 33, 133, and 233 to achieve the same effect. The embodiments of the invention described and shown in the drawings are not intended to limit the scope of the invention which is defined by the claims which follow.

We claim the exclusive property or privilege in the embodiments of the invention defined as:

1. An apparatus for bending and tempering a heated sheet of glass, the sheet having a central portion, a perimeter, and an edge, said apparatus comprising:

a rigid mold having a molding surface; and a conformable pressing element, at least one of said conformable pressing element and said rigid mold being constructed and arranged to reciprocate between a holding position with said conformable pressing element spaced from said rigid mold, an initial pressing position with said conformable pressing element initially pressing at least a portion of the heated sheet of glass against a portion of said rigid mold, and a final pressing position for pressing and rolling the heated sheet against said rigid mold, at least one of said conformable pressing element and said rigid mold being constructed and arranged to cool the heated sheet of glass thereby tempering the heated sheet of glass, and said conformable pressing element being constructed and arranged to extend to form a convex shape for initially pressing on one of a central portion and a peripheral portion of the heated sheet when in said initial pressing position, and said conformable pressing element further constructed and arranged for rolling the sheet against said rigid mold for conforming the heated sheet to said molding surface of said rigid mold when in said final pressing position.

2. An apparatus according to claim 1, wherein at least one of said rigid mold and said conformable pressing element includes a cover, said cover being constructed and arranged to cool the heated sheet of glass.

3. An apparatus according to claim 2, wherein said cover comprises a fiberglass cloth.

4. An apparatus according to claim 2, wherein said cover includes a plurality of openings, said cover being inflated by a gas, and said openings for directing the gas to the heated sheet of glass thereby cooling the heated sheet of glass.

5. An apparatus according to claim 1, wherein said molding surface of said rigid mold comprises a material selected from the group consisting of silver, copper, aluminum, molybdenum, uranium, titanium, steel, metal alloy, diamond, composites, and boron nitrate.

6. An apparatus according to claim 1, further comprising a carrier for holding the heated sheet, said carrier including a flexible support surface for holding the heated sheet before, during, and after bending and tempering, said conformable pressing element pressing on said flexible support surface for pressing and rolling the heated sheet of glass against said molding surface of said rigid mold.

7. An apparatus for bending and tempering a heated sheet of glass, the sheet having a central portion, a perimeter, and an edge, said apparatus comprising:

a rigid mold having a molding surface; and a conformable pressing element, one of said conformable pressing element and said rigid mold being constructed and arranged to reciprocate between a holding position and a pressing position for pressing and rolling the heated sheet against said rigid mold, one of said conformable pressing element and said rigid mold being constructed and arranged to cool the heated sheet of glass thereby tempering the heated sheet of glass, at least one of said rigid mold and said conformable pressing element including a cover, said cover including a plurality of openings and being inflated by a gas, said openings for directing the gas to the heated sheet of glass thereby cooling the heated sheet of glass, said cover including a perimeter and a central portion, said cover having a greater density of said openings at said perimeter of said cover than at said central portion of said cover for directing more gas to the perimeter of the heated sheet to thereby cool the edge of the heated sheet at least as fast as the central portion of the heated sheet to temper the heated sheet, and said conformable pressing element being constructed and arranged for pressing and rolling the sheet against said rigid mold for conforming the heated sheet to said molding surface of said rigid mold.

8. An apparatus for bending and tempering a heated sheet of glass, the sheet having a central portion, a perimeter, and an edge, said apparatus comprising:

a rigid mold having a molding surface; and a conformable pressing element, one of said conformable pressing element and said rigid mold being constructed and arranged to reciprocate between a holding position and a pressing position for pressing and rolling the heated sheet against said rigid mold, at least one of said rigid mold and said conformable pressing element including a cover, said cover being constructed and arranged to cool the heated sheet of glass, said cover including a peripheral region and a central region, said peripheral region having a first thermal coefficient of conductivity and a first heat capacity, said central region having a second thermal coefficient of conductivity and a second heat capacity, said first thermal coefficient of conductivity and said first heat capacity being greater than said second thermal coefficient of conductivity and said second heat capacity, respectively, for cooling the perimeter of the heated sheet at least as fast as the central portion of the heated sheet of glass to thereby temper the edge of the sheet of glass, and said conformable pressing element being constructed and arranged for pressing and rolling the sheet against said rigid mold for conforming the heated sheet to said molding surface of said rigid mold.

9. An apparatus according to claim 8, wherein said conformable pressing element has a size sufficient for extending over the heated sheet of glass and beyond the perimeter of the heated sheet of glass, said cover extending over said conformable pressing element for substantially enclosing the heated sheet of glass between said cover and said rigid mold.

10. An apparatus according to claim 8, said cover having a plurality of inserts defining said first and second thermal coefficients of conductivity and heat capacities, each of said inserts having a coefficient of thermal conductivity in the range of about 10 to 500 BTU/(hr.ft.° F.) and a heat capacity in the range of about 0.1 to 100 BTU/ft$^3$-° F.

11. An apparatus according to claim 10, wherein each of said inserts have a coefficient of thermal conductivity in the range of about 30 to 300 BTU/(hr.ft.° F.).

12. An apparatus according to claim 1, wherein each of said inserts have a coefficient of thermal conductivity in a range of about 46 to 247 BTU/(hr.ft.° F.) and a heat capacity in a range of about 30 to 70 BTU/ft$^3$-° F.

13. An apparatus for bending and tempering a heated sheet of glass, the sheet having a central portion, a perimeter, and an edge, said apparatus comprising:
  a rigid mold having a molding surface;
  a conformable pressing element, one of said conformable pressing element and said rigid mold being constructed and arranged to reciprocate between a holding position and a pressing position for pressing and rolling the heated sheet against said rigid mold, at least one of said rigid mold and said conformable pressing element including a cover, said cover being constructed and arranged to cool the heated sheet of glass thereby tempering the heated sheet of glass, said conformable pressing element being constructed and arranged to extend to form a convex shape for initially pressing on one of a central portion and a peripheral portion of the heated sheet, and said conformable pressing element further constructed and arranged for rolling the sheet against said rigid mold for conforming the heated sheet to said molding surface of said rigid mold; and
  a frame supporting said conformable pressing element, said frame including a chamber below said conformable pressing element and a substantially incompressible, pressurized fluid in said chamber for expanding and urging said conformable pressing element into a convex shape having an apex.

14. An apparatus according to claim 13, further comprising a heat exchanger, said heat exchanger cooperating with said chamber to cool said incompressible fluid and thereby cool said conformable pressing element for increasing the heat transfer from the heated sheet of glass to the fluid thereby cooling the heated sheet of glass.

15. An apparatus according to claim 14, wherein said heat exchanger is external of said chamber, said incompressible fluid flowing through said heat exchanger to cool said incompressible fluid.

16. An apparatus for bending and tempering a heated sheet of glass, the sheet having a central portion and a perimeter, said apparatus comprising:
  a rigid mold having a molding surface;
  a flexible diaphragm constructed and arranged to extend to form a convex pressing surface for initially pressing on a central portion of the heated sheet, at least one of said flexible diaphragm and said rigid mold being constructed and arranged to move between a holding position wherein said flexible diaphragm is spaced from said rigid mold, an initial pressing position wherein said flexible diaphragm presses the central portion of the heated sheet against a portion of said rigid mold, and a final pressing position wherein said flexible diaphragm rolls the heated sheet against said rigid mold from the central portion to the perimeter of the heated sheet for conforming the heated sheet to said molding surface of said rigid mold; and
  a conduit positioned for delivering a gas to at least a portion of the heated sheet of glass for cooling the heated sheet of glass during bending to thereby temper the portion of the heated sheet of glass.

17. An apparatus according to claim 16, further comprising a press frame, said rigid mold being supported by said press frame and having a periphery, said conduit comprising a manifold, said manifold being supported by said press frame and extending around said periphery of said rigid mold and being constructed and arranged to direct the gas to the edge of the heated sheet of glass.

18. An apparatus according to claim 16, wherein said molding surface of said rigid mold comprises a material selected from the group consisting of silver, copper, aluminum, molybdenum, uranium, titanium, steel, metal alloy, diamond, composites, and boron nitrate.

19. An apparatus according to claim 16, wherein said molding surface includes a layer of material selected from the group consisting of silver, copper, aluminum, molybdenum, uranium, titanium, steel, metal alloy, diamond, composites, and boron nitrate.

20. An apparatus according to claim 16, wherein said rigid mold comprises a rigid male mold having a generally convex molding surface.

21. An apparatus according to claim 16, wherein one of said rigid mold and said flexible diaphragm includes a cover constructed and arranged to cool the heated sheet of glass.

22. An apparatus according to claim 21, wherein said cover comprises fiberglass cloth.

23. An apparatus according to claim 22, wherein said cover has a thickness in a range of about 0.002 inches to 0.05 inches.

24. An apparatus according to claim 21, wherein said cover comprises a porous cover, said porous cover being inflated by a source of a gas and for directing the gas to the heated sheet of glass thereby cooling and tempering the heated sheet.

25. An apparatus according to claim 24, wherein said porous cover includes a plurality of openings for directing the gas to the heated sheet of glass and thereby cooling the heated sheet.

26. An apparatus according to claim 25, wherein said flexible diaphragm includes said porous cover.

27. An apparatus according to claim 16, in combination with the heated sheet of glass, said flexible diaphragm rolling said heated sheet of glass against said rigid mold and being constructed and arranged to cool said heated sheet of glass to thereby temper the heated sheet of glass.

28. An apparatus according to claim 16, wherein said gas comprises one of air, nitrogen, carbon dioxide, a moisture laden air, an air fog, an anatomized liquid, and steam.

29. An apparatus for bending and tempering a heated sheet of glass, the sheet having a central portion and a perimeter, said apparatus comprising:

a rigid mold having a molding surface;

a conformable pressing element, one of said conformable pressing element and said rigid mold being constructed and arranged to reciprocate between a holding position and a pressing position, said conformable pressing element being constructed and arranged for pressing and for rolling the heated sheet against said rigid mold for conforming the heated sheet to said molding surface of said rigid mold;

a press frame, said rigid mold being supported by said press frame and having a periphery; and a conduit positioned for delivering a gas to at least a portion of the heated sheet of glass for cooling the heated sheet of glass during bending to thereby temper the portion of the heated sheet of glass, said conduit comprising a manifold, said manifold being supported by said press frame and extending around said periphery of said rigid mold and being constructed and arranged to direct the gas to the edge of the heated sheet of glass, and one of said manifold and said molding surface of said rigid mold including at least one vent for exhausting the gas from between said rigid mold and said conformable pressing element.

30. An apparatus for bending and tempering a heated sheet of glass, the sheet having a central portion and perimeter, said apparatus comprising:

a rigid mold having a molding surface;

a conformable pressing element, one of said conformable pressing element and said rigid mold being constructed and arranged to reciprocate between a holding position and a pressing position, said conformable pressing element being constructed and arranged for pressing and for rolling the heated sheet against said rigid mold for conforming the heated sheet to said molding surface of said rigid mold;

a press frame, said rigid mold being supported by said press frame and having a periphery;

a conduit positioned for delivering a gas to at least a portion of the heated sheet of glass for cooling the heated sheet of glass during bending to thereby temper the portion of the heated sheet of glass, said conduit comprising a manifold, said manifold being supported by said press frame and extending around said periphery of said rigid mold and being constructed and arranged to direct the gas to the edge of the heated sheet of glass; and a frame having an open end, said frame supporting said conformable pressing element over said open end, and said conformable pressing element being constructed and arranged to flex in and out of said open end of said frame for pressing the sheet against said rigid mold, said manifold being interposed between said rigid mold and said conformable pressing element for directing the gas at the perimeter of the heated sheet while the heated sheet is being pressed and rolled against said rigid mold and said conformable pressing element conforming to said manifold.

31. An apparatus according to claim 30, wherein said conformable pressing element comprises a flexible diaphragm, said flexible diaphragm covering said open end of said frame, said diaphragm and said frame defining a chamber, said chamber being filled with a pressurized, substantially incompressible fluid, said substantially incompressible fluid being constructed and arranged to extend said diaphragm to form a convex upper surface for pressing and rolling the heated sheet of glass against said rigid mold, the pressure being applied to the heated sheet by said diaphragm being independent of the position of said conformable pressing element and said rigid mold.

32. An apparatus according to claim 31, wherein said incompressible fluid is constructed and arranged to cool said diaphragm for increasing heat transfer from the heated sheet of glass through said diaphragm to said incompressible fluid thereby cooling and tempering the heated sheet of glass.

33. An apparatus according to claim 32, further comprising a heat exchanger cooperating with said chamber, said heat exchanger cooling said incompressible fluid.

34. An apparatus according to claim 33, wherein said heat exchanger is in fluid communication with said incompressible fluid.

35. An apparatus according to claim 33, wherein said heat exchanger comprises a coil positioned in said chamber, said coil being immersed in said incompressible fluid for cooling said incompressible fluid.

36. An apparatus for bending and tempering a heated sheet of glass, the sheet having a central portion and a perimeter, said apparatus comprising:

a rigid mold having a molding surface;

a conformable pressing element, one of said conformable pressing element and said rigid mold being constructed and arranged to reciprocate between a holding position and a pressing position, said conformable pressing element being constructed and arranged for pressing and for rolling the heated sheet against said rigid mold for conforming the heated sheet to said molding surface of said rigid mold, one of said rigid mold and said conformable pressing element including a cover constructed and arranged to cool the heated sheet of glass, said cover including a peripheral region and a central region, said peripheral region having a first thermal coefficient of conductivity and a first heat capacity, said central region having a second thermal coefficient of conductivity and a second heat capacity, said first thermal coefficient of conductivity and said first heat capacity being greater than said second thermal coefficient of conductivity and said second heat capacity, respectively, for cooling the perimeter of the heated sheet at least as fast as the central portion of the heated sheet of glass to thereby temper the edge of the sheet of glass; and a conduit positioned for delivering a gas to at least a portion of the heated sheet of glass for cooling the heated sheet of glass during bending to thereby temper the portion of the heated sheet of glass.

37. An apparatus for bending and tempering a heated sheet of glass, the sheet having a central portion and a perimeter, said apparatus comprising:

a rigid mold having a molding surface;

a conformable pressing element, one of said conformable pressing element and said rigid mold being constructed and arranged to reciprocate between a holding position and a pressing position, said conformable pressing element constructed and arranged for pressing and for rolling the heated sheet against said rigid mold for conforming the heated sheet to said molding surface of said rigid mold, one of said rigid mold and said conformable pressing element including a cover constructed and arranged to cool the heated sheet of glass, said cover comprising a porous cover, said porous cover being inflated by a source of gas and including a plurality of openings for directing the gas to the heated sheet of glass thereby cooling and tempering the heated sheet wherein a greater number of said openings are positioned on said cover for directing more gas to the perimeter than for the central portion of the heated sheet of glass to thereby cool the perimeter at least as fast as the central portion of the heated sheet of glass; and a conduit positioned for delivering a gas to at least a portion of the heated sheet of glass for cooling the heated sheet of glass during bending to thereby temper the portion of the heated sheet of glass.

38. An apparatus for bending and tempering a heated sheet of glass the sheet having a central portion and perimeter, said apparatus comprising:

a rigid mold having a molding surface;

a conformable pressing element, one of said conformable pressing element and said rigid mold being constructed and arranged to reciprocate between a holding position and a pressing position, said conformable pressing element being constructed and arranged for pressing and for rolling the heated sheet against said rigid mold for conforming the heated sheet to said molding surface of said rigid mold; and a conduit positioned for delivering a gas to at least a portion of the heated sheet of glass for cooling the heated sheet of glass during bending to thereby temper the portion of the heated sheet of glass said conduit comprising a groove in said molding surface of said rigid mold, said groove having an insert positioned therein, and said insert having one of a greater thermal conductivity and a greater heat capacity than said molding surface and being constructed and arranged for cooling the perimeter of the sheet at a faster rate thereby edge tempering the sheet.

39. An apparatus according to claim 38, wherein said insert comprises a silicone open cell material.

40. A bending apparatus for bending and tempering a sheet of glass heated to a formable state, the sheet having a central portion and a peripheral edge, said bending apparatus comprising:

a rigid mold having a molding surface, said molding surface having a first thermal conductivity and a first heat capacity in a central portion thereof and a second thermal conductivity and a second heat capacity in a peripheral portion thereof, wherein said first thermal conductivity and said first heat capacity is less than said second thermal conductivity and said second heat capacity, respectively; and a flexible diaphragm pressurized to form a convex shape for pressing and rolling the sheet of glass against said molding surface for conforming the sheet to said molding surface, said second thermal conductivity and heat capacity of said peripheral portion of said molding surface for cooling the edge of the sheet at least as fast as the central portion of the sheet to thereby induce edge tempering of the heated sheet of glass.

41. A bending and tempering apparatus according to claim 40, wherein said rigid mold includes an insert at said peripheral portion, said insert providing said second thermal conductivity and heat capacity.

42. A bending and tempering apparatus according to claim 41, wherein said insert comprises a silicone open cell sponge material.

43. A bending and tempering apparatus according to claim 41, wherein said insert is constructed and arranged to hold a fluid, said fluid for cooling the edge of the heated sheet.

44. A bending and tempering apparatus according to claim 43, wherein said rigid mold includes a passageway for delivering said fluid to said insert.

45. A bending and tempering apparatus according to claim 41, wherein said insert comprises an annular insert, said annular insert for aligning with the peripheral edge of the heated sheet of glass to increase the heat transfer from the edge of the heated sheet of glass and for cooling the edge of the heated sheet of glass at least as fast as the central portion of the heated sheet of glass to thereby temper the sheet of glass.

46. A bending and tempering apparatus according to claim 41, wherein said flexible diaphragm includes a cover having inserts, said inserts having a thermal coefficient of conductivity and heat capacity in the range of 10 to 500 BTU/(hr.ft.° F.) and heat capacity in the range of about 0.1 to 100 $BTU/ft^3$-° F. for further cooling and tempering the sheet of glass while the sheet is being pressed and rolled against said rigid mold.

47. An apparatus according to claim 41, wherein said flexible diaphragm includes a cover having a coefficient of thermal conductivity in the range of about 30 to 300 BTU/(hr.ft.° F.).

48. An apparatus according to claim 41, wherein said flexible diaphragm includes a cover having a coefficient of thermal conductivity in a range of about 46 and 247 BTU/(hr.ft.° F.) and a heat capacity in a range of about 30 to 70 $BTU/ft^3$-° F.

49. A bending and tempering apparatus according to claim 41, wherein said mold comprises a material selected from the group consisting of silver, copper, aluminum, molybdenum, uranium, titanium, steel, metal alloy, diamond, composites, and boron nitrate.

50. A bending and tempering apparatus according to claim 41, wherein said mold includes a layer of material selected from the group consisting of silver, copper, aluminum, molybdenum, uranium, titanium, steel, metal alloy, diamond, composites, and boron nitrate, said layer defining said molding surface.

51. A bending and tempering apparatus according to claim 41, wherein said molding surface includes a groove receiving and holding said insert therein.

52. A bending and tempering apparatus according to claim 41, further comprising a frame having an open end, said frame supporting said flexible diaphragm over said open end, said frame defining a chamber below said flexible diaphragm, and a pressurizing system said pressurizing system comprising:

an incompressible fluid positioned in said chamber; and an inflatable member positioned in said chamber, said inflatable member constructed and arranged to inflate and deflate to increase and decrease the pressure of said incompressible fluid and urge said flexible diaphragm into said convex shape.

53. A bending and tempering apparatus according to claim 52, further comprising a cooling system, said cooling system comprising:

a heat exchanger cooperating with said chamber, said incompressible fluid circulating through said heat exchanger to cool said incompressible fluid and said flexible diaphragm for contact tempering the heated sheet of glass.

54. A bending and tempering apparatus according to claim 41, further comprising an air manifold positioned for directing air to the edge of the heated sheet of glass during bending to cool the edge thereby tempering the heated sheet of glass.

55. An apparatus for bending and tempering a heated sheet of glass, said apparatus comprising:

a press frame;

a rigid mold supported by said press frame, said rigid mold having at least one molding surface;

a bladder frame having an open end;

a flexible membrane supported by said bladder frame over said open end and spaced from said press frame, said flexible membrane defining a chamber with said bladder frame, said chamber including an inlet and outlet through which the chamber is pressurized during a press cycle such that when said chamber is pressurized, said flexible membrane is extended from said bladder frame forming a convex top surface for pressing the heated sheet and for rolling the heated sheet against said molding surface of said rigid mold, one of said rigid mold and said bladder frame being constructed and arranged to move toward the other during the press cycle, the pressure applied to the heated sheet being independent of the movement of said rigid mold and said bladder frame; and a cooling system cooling at least one of said molding surface and said flexible membrane for tempering the heated sheet of glass while pressing and rolling the heated sheet against said molding surface.

56. A bending and tempering apparatus according to claim 55, wherein said chamber is filled with a substantially incompressible fluid in contact with said flexible membrane, said chamber including an inflatable bladder for increasing the pressure of said incompressible fluid against said flexible membrane.

57. A bending and tempering apparatus according to claim 56, wherein said cooling system removes heat from said incompressible fluid and thereby cools said flexible membrane.

58. A bending and tempering apparatus according to claim 55, wherein said cooling system directs cooling water through said rigid mold to thereby cool said molding surface.

59. A bending and tempering apparatus according to claim 55, wherein at least one of said rigid mold and said flexible membrane includes a cover constructed and arranged for cooling the heated sheet of glass.

60. A bending and tempering apparatus according to claim 59, wherein said cover comprises a porous cover and is constructed and arranged to be inflated by a gas, said porous cover having a plurality of openings for directing the gas to the heated sheet of glass to thereby temper the heated sheet.

61. A bending and tempering apparatus according to claim 59, wherein said cover includes a plurality of copper inserts.

62. A bending and tempering apparatus according to claim 61, wherein said copper inserts comprise one of a copper powder suspended in a silicone rubber matrix and copper fibers suspended in a silicone rubber matrix.

63. A bending and tempering apparatus according to claim 61, wherein said inserts are dispersed into the material of said cover and molded along with said cover.

64. A bending and tempering apparatus according to claim 61, said cover having a periphery and a central portion, said cover having a higher concentration of said inserts around said periphery of said cover than said central portion of said cover, said periphery of said cover for aligning with the perimeter of the heated sheet of glass for increasing the rate of cooling of the edge of the heated sheet of glass thereby tempering the sheet of glass.

65. A bending and tempering apparatus according to claim 55, further comprising an air manifold positioned for directing a gas to the heated sheet of glass for cooling the heated sheet of glass while the heated sheet of glass is pressed and rolled against said rigid mold.

66. A bending and tempering apparatus according to claim 55, further comprising a carrier for holding the heated sheet of glass between said rigid mold and said flexible membrane, said carrier including a flexible support surface for holding the heated sheet before, during, and after bending and tempering.

* * * * *

UNITED STATES PATENT AND TRADEMARK OFFICE
CERTIFICATE OF CORRECTION

PATENT NO. : 5,938,810
DATED : August 17, 1999
INVENTOR(S) : Martin De Vries, Jr., et al.

It is certified that error appears in the above-identified patent and that said Letters Patent is hereby corrected as shown below:

Title page,
Under Inventors, "Marrin De Vries, Jr." should be -- Martin De Vries, Jr. --.

Column 1,
Line 6, please insert -- co-pending -- after "This is a continuation-in-part of".

Column 15,
Line 22, please delete "10" and insert in lieu thereof -- 110 --.

Column 22,
Line 62, please delete "Coring" and insert in lieu thereof -- Corning --.

Column 31, claim 30,
Line 37, please insert -- a -- before "perimeter".

Column 33, claim 38,
Line 37, please insert -- , -- after "glass".

Column 34, claim 52,
Line 57, please insert -- , -- after "a pressurizing system".

Signed and Sealed this

Thirtieth Day of October, 2001

Attest:

NICHOLAS P. GODICI
Attesting Officer    Acting Director of the United States Patent and Trademark Office